(12) United States Patent
Taylor et al.

(10) Patent No.: US 11,100,708 B2
(45) Date of Patent: Aug. 24, 2021

(54) SPACE CAPTURE, MODELING, AND TEXTURE RECONSTRUCTION THROUGH DYNAMIC CAMERA POSITIONING AND LIGHTING USING A MOBILE ROBOT

(71) Applicant: Sony Interactive Entertainment Inc., Tokyo (JP)

(72) Inventors: Michael Taylor, San Mateo, CA (US); Erik Beran, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/927,887

(22) Filed: Jul. 13, 2020

(65) Prior Publication Data
US 2020/0342661 A1    Oct. 29, 2020

Related U.S. Application Data

(63) Continuation of application No. 15/853,667, filed on Dec. 22, 2017, now Pat. No. 10,713,840.

(51) Int. Cl.
*G06T 7/50* (2017.01)
*G06T 17/00* (2006.01)
(Continued)

(52) U.S. Cl.
CPC ............ *G06T 17/05* (2013.01); *A63F 13/213* (2014.09); *A63F 13/217* (2014.09); *A63F 13/24* (2014.09);
(Continued)

(58) Field of Classification Search
CPC .............................. G06T 17/00; G06T 15/04
See application file for complete search history.

(56) References Cited

U.S. PATENT DOCUMENTS 7,714,895 B2    5/2010  Pretlove et al.
2009/0060318 A1  3/2009  Shimada et al.
(Continued)

OTHER PUBLICATIONS

Klinker et al., "Augmented Reality for Exterior Construction Applications," In: Augmented Reality and Wearable Computers, Lawrence Erlbaum Press, US, Jan. 1, 2001, pp. 379-427, XP002381225.
Young Eun Song et al., "Multimodal Multi-user Human-Robot Interface for Virtual Collaboration," 2012 9th International Conference on Ubiquitous Robots and Ambient Intelligence (URAI), IEEE, Nov. 26, 2012, pp. 18-22, XP032330951, DOI: 10.1109/URAI.2012.6462920, ISBN: 978-1-4673-3111-1.
(Continued)

*Primary Examiner* — Diane M Wills
(74) *Attorney, Agent, or Firm* — Penilla IP, APC

(57) ABSTRACT

A method is provided, including: using a robot having a plurality of sensors to acquire sensor data about a local environment; processing the sensor data to generate a spatial model of a real object, the spatial model defining virtual surfaces that correspond to real surfaces of the real object; further processing the sensor data to generate texture information that is associated to the virtual surfaces; wherein using the robot to acquire sensor data includes sampling at least one representative portion by moving the robot to different locations and capturing images of a given representative portion from a plurality of angles; wherein processing the sensor data to generate the texture information includes processing the images captured from the plurality of angles to generate texture information; using the spatial model and the texture information to render a virtual object corresponding to the real object in a virtual environment.

14 Claims, 13 Drawing Sheets

(51) Int. Cl.
  *G06T 19/00* (2011.01)
  *G06T 17/05* (2011.01)
  *G06F 3/0481* (2013.01)
  *G02B 27/01* (2006.01)
  *A63F 13/25* (2014.01)
  *G06F 3/01* (2006.01)
  *A63F 13/24* (2014.01)
  *A63F 13/217* (2014.01)
  *A63F 13/65* (2014.01)
  *A63F 13/213* (2014.01)
  *A63F 13/5255* (2014.01)
  *G06T 7/174* (2017.01)
  *G06T 7/586* (2017.01)

(52) U.S. Cl.
  CPC .......... *A63F 13/25* (2014.09); *A63F 13/5255* (2014.09); *A63F 13/65* (2014.09); *G02B 27/017* (2013.01); *G06F 3/012* (2013.01); *G06F 3/04815* (2013.01); *G06T 7/174* (2017.01); *G06T 7/50* (2017.01); *G06T 7/586* (2017.01); *G06T 17/00* (2013.01); *G06T 19/003* (2013.01); *G06T 2200/08* (2013.01); *G06T 2207/10152* (2013.01); *G06T 2210/61* (2013.01)

(56) References Cited

U.S. PATENT DOCUMENTS

| | | | |
|---|---|---|---|
| 2012/0306853 A1* | 12/2012 | Wright | G06T 19/20 345/419 |
| 2014/0247261 A1 | 9/2014 | Lenser et al. | |
| 2015/0073646 A1 | 3/2015 | Rosenstein et al. | |
| 2015/0097827 A1 | 4/2015 | Cohen et al. | |
| 2016/0292911 A1 | 10/2016 | Sparks | |
| 2017/0161561 A1 | 6/2017 | Marty et al. | |
| 2017/0206712 A1 | 7/2017 | Petrovskaya et al. | |
| 2017/0225332 A1 | 8/2017 | Deyle et al. | |
| 2017/0305010 A1 | 10/2017 | Fong et al. | |
| 2017/0361468 A1 | 12/2017 | Cheuvront et al. | |
| 2018/0014392 A1 | 1/2018 | Charlton et al. | |
| 2018/0181195 A1 | 6/2018 | Herman et al. | |
| 2019/0212750 A1 | 7/2019 | Hou | |

OTHER PUBLICATIONS

Okura, Fumio et al., "Teleoperation of Mobile Robots by Generating Augmented Free-viewpoint Images," 2013 IEEE/RSJ International Conference on Intelligent Robots and Systems, IEEE, Nov. 3, 2013, pp. 565-671, XP032537921, ISSN: 2153-0858, DOI: 10.1109/IROS.2013.6696422 [retrieved on Dec. 26, 2013].

MHD Yamen Saraiji et al., "Enforced Telexistence: Teloperating Using Photorealistic Virtual Body and Haptic Feedback," Nov. 24, 2014, pp. 1-2, XP058061596, DOI: 10.1145/2669047.2669048, ISBN: 978-1-4503-1955-3.

Mossel, Annette et al., "Streaming and Exploration of Dynamically Changing Dense 3D Reconstructions in Immersive Virtual Reality," 2016 IEEE International Symposium on Mixed and Augmented Reality (ISMAR-ADJUNCT), IEEE, Sep. 19, 2016, pp. 43-48, XP033055406, DOI: 10.1109/ISMAR-ADJUNCT.2016.0035 [retrieved on Jan. 30, 2017].

Prexl, Maximilian et al., User Studies of a Head-Mounted Display for Search and Rescue Teleoperation of UAVs via Satellite Link, 2017 IEEE Aerospace Conference, IEEE, Mar. 4, 2017, pp. 1-8, XP033102664, DOI: 10.1109/AERO.2017.7943596 [retrieved on Jun. 7, 2017].

Thomason, John et al., "Adaptive View Management for Drone Teleoperation in Complex 3D Structures," Intelligent User Interfaces, ACM, 2 Penn Plaza, Ste. 701, New York, NY, 10121-0701, USA, Mar. 7, 2017, pp. 419-426, XP058316958, DOI: 10.1145/3025171.3025179, ISBN: 978-1-4503-4348-0.

Tikanmaki, Antti et al., "The Remote Operation and Environment Reconstruction of Outdoor Mobile Robots Using Virtual Reality," 2017 IEEE International Conference on Mechatronics and Automation (ICMA), IEEE, Aug. 6, 2017, pp. 1526-1531, XP033145063, DOI: 10.1109/ICMA.2017.8016043, ISBN: 978-1-5090-6758-9 [retrieved on Aug. 23, 2017].

PCT Invitation to Pay Additional Fees (Form PCT/ISA/206), issued in counterpart International Application No. PCT/US2018/066599, dated Apr. 3, 2019 (16 total pages).

PCT International Search Report (ISR) and the Written Opinion (WO) of the International Searching Authority, or the Declaration; ISR; WO (Forms PCT/ISA/220; PCT/ISA/210; PCT/ISA/237), issued in counterpart International Application No. PCT/US2018/066599, dated May 24, 2019 (21 total pages.).

* cited by examiner

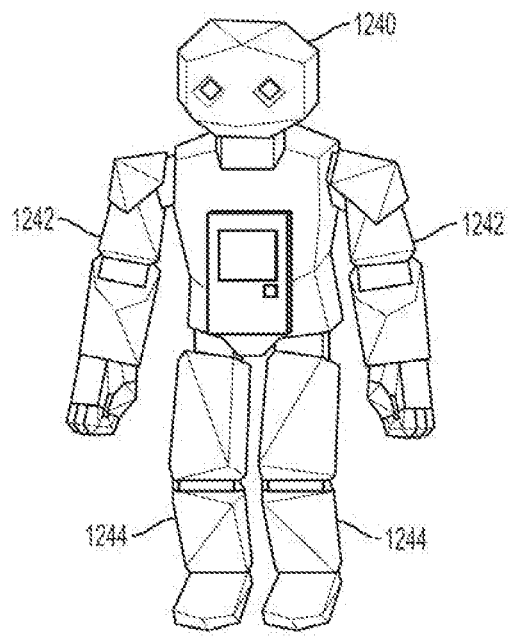
FIG. 7E
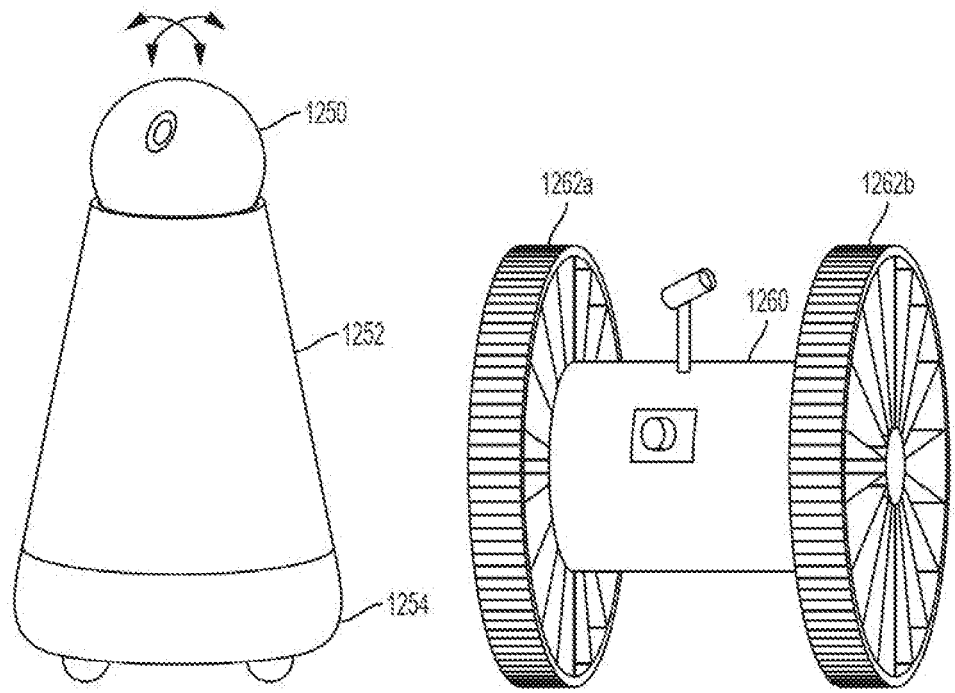
FIG. 7F
FIG. 7G

SPACE CAPTURE, MODELING, AND TEXTURE RECONSTRUCTION THROUGH DYNAMIC CAMERA POSITIONING AND LIGHTING USING A MOBILE ROBOT

BACKGROUND

1. Field of the Disclosure

The present disclosure relates to space capture, modeling, and texture reconstruction through dynamic camera positioning and lighting using a mobile robot, and related methods, apparatus, and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

A head-mounted display (HMD) provides an immersive virtual reality experience, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD. The processing resources required to generate high quality video (e.g. at high resolution and frame rate) for rendering on the HMD are considerable and may therefore be handled by a separate computing device, such as a personal computer or a game console. In such systems, the computing device generates the video for rendering to the HMD, and transmits the video to the HMD.

However, when wearing an HMD, the user is unable to see the local environment in which they are situated.

It is in this context that implementations of the disclosure arise.

SUMMARY

Implementations of the present disclosure include devices, methods and systems relating to space capture, modeling, and texture reconstruction through dynamic camera positioning and lighting using a mobile robot.

In some implementations, a method is provided, including the following method operations: using a robot having a plurality of sensors to acquire sensor data about a local environment; processing the sensor data to generate a spatial model of the local environment, the spatial model defining virtual surfaces that correspond to real surfaces in the local environment; further processing the sensor data to generate texture information that is associated to the virtual surfaces defined by the spatial model; tracking a location and orientation of a head-mounted display (HMD) in the local environment; using the spatial model, the texture information, and the tracked location and orientation of the HMD to render a view of a virtual space that corresponds to the local environment; presenting the view of the virtual environment through the HMD.

In some implementations, the location of the HMD in the local environment defines a perspective from which the view of the virtual space is rendered.

In some implementations, the orientation of the HMD in the local environment defines a direction of the view of the virtual space.

In some implementations, rendering the view of the virtual space includes rendering one or more of the virtual surfaces, which are defined by the spatial model, using the texture information associated to the one or more of the virtual surfaces.

In some implementations, the sensors include at least one image capture device and at least one depth camera, and wherein the sensor data includes image data captured by the image capture device and depth data captured by the depth camera.

In some implementations, the texture information includes one or more of a diffuse map, a bump map, and/or a specular map.

In some implementations, using the robot to acquire sensor data includes moving the robot to a plurality of locations within the local environment and using the sensors of the robot at each of the locations to sense the local environment and generate the sensor data.

In some implementations, acquiring the sensor data includes capturing images of a real surface in the local environment from a plurality of angles; and, processing the sensor data to generate the texture information includes processing the images captured from the plurality of angles to generate texture information for a given virtual surface defined by the spatial model that corresponds to the real surface.

In some implementations, a method is provided, including: using a robot to effect a plurality of lighting conditions in a local environment and using a plurality of sensors of the robot to acquire sensor data about the local environment under the plurality of lighting conditions; processing the sensor data to generate a spatial model of the local environment, the spatial model defining virtual surfaces that correspond to real surfaces in the local environment; further processing the sensor data to generate texture information that is associated to the virtual surfaces defined by the spatial model.

In some implementations, using the robot to effect the plurality of lighting conditions includes accessing a home lighting control system by the robot to control one or more lights in the local environment.

In some implementations, using the robot to effect the plurality of lighting conditions includes using a light included in the robot to illuminate at least a portion of the local environment.

In some implementations, using the robot to effect the plurality of lighting conditions includes moving the robot to one or more locations so as to block light from a light source in the local environment from directly reaching a surface in the local environment.

In some implementations, the sensors include at least one image capture device and at least one depth camera, and wherein the sensor data includes image data captured by the image capture device and depth data captured by the depth camera.

In some implementations, the texture information includes one or more of a diffuse map, a bump map, and/or a specular map.

In some implementations, using the robot to acquire sensor data includes moving the robot to a plurality of locations within the local environment and using the sensors of the robot at each of the locations to sense the local environment and generate the sensor data.

In some implementations, a method performed by a robot in a local environment is provided, including: capturing a first image of the local environment by an image capture device of the robot positioned at a first location in the local environment, wherein capturing the first image includes capture of a real surface in the local environment; processing the first image to determine texture information of the real surface, and further determine that a possible error exists in the determined texture information of the real surface; in response to determining the possible error, moving the robot to a second location, and capturing a second image of the local environment by the image capture device at the second location, wherein capturing the second image includes capture of the real surface from a perspective defined from the second location; processing the second image to verify the possible error in the determined texture information of the real surface, and correct the possible error in the determined texture information of the real surface.

In some implementations, processing the second image to verify the possible error in the determined texture information of the real surface includes comparing a portion of the first image to a corresponding portion of the second image, the portions of the first and second images being of a same region of the real surface.

In some implementations, correcting the possible error includes replacing a portion of the determined texture information of the real surface based on the processing of the second image.

In some implementations, the texture information defines one or more of color and surface structure.

In some implementations, method performed by a robot in a local environment is provided, including: capturing a first depth image of the local environment by a depth camera of the robot positioned at a first location in the local environment; processing the first depth image to determine a spatial structure of the local environment, and further determine that a possible error exists in the determined spatial structure of the local environment; in response to determining the possible error, moving the robot to a second location, and capturing a second depth image of the local environment by the depth camera at the second location, wherein capturing the second depth image includes capture of the local environment from a perspective defined from the second location; processing the second image to verify the possible error in the determined spatial structure, and correct the possible error in the determined spatial structure.

In some implementations, processing the second depth image to verify the possible error in the determined spatial structure includes comparing a portion of the first depth image to a corresponding portion of the second depth image, the portions of the first and second depth images being of a same region of the local environment.

In some implementations, correcting the possible error includes replacing a portion of the determined spatial structure of the local environment based on the processing of the second image.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 7A-7G illustrate various types of robots, in accordance with implementations of the disclosure.

DETAILED DESCRIPTION

The following implementations of the present disclosure provide devices, methods, and systems relating to space capture, modeling, and texture reconstruction through dynamic camera positioning and lighting using a mobile robot. It will be obvious, however, to one skilled in the art, that the present disclosure may be practiced without some or all of the specific details presently described. In other instances, well known process operations have not been described in detail in order not to unnecessarily obscure the present disclosure.

Figure 1A:
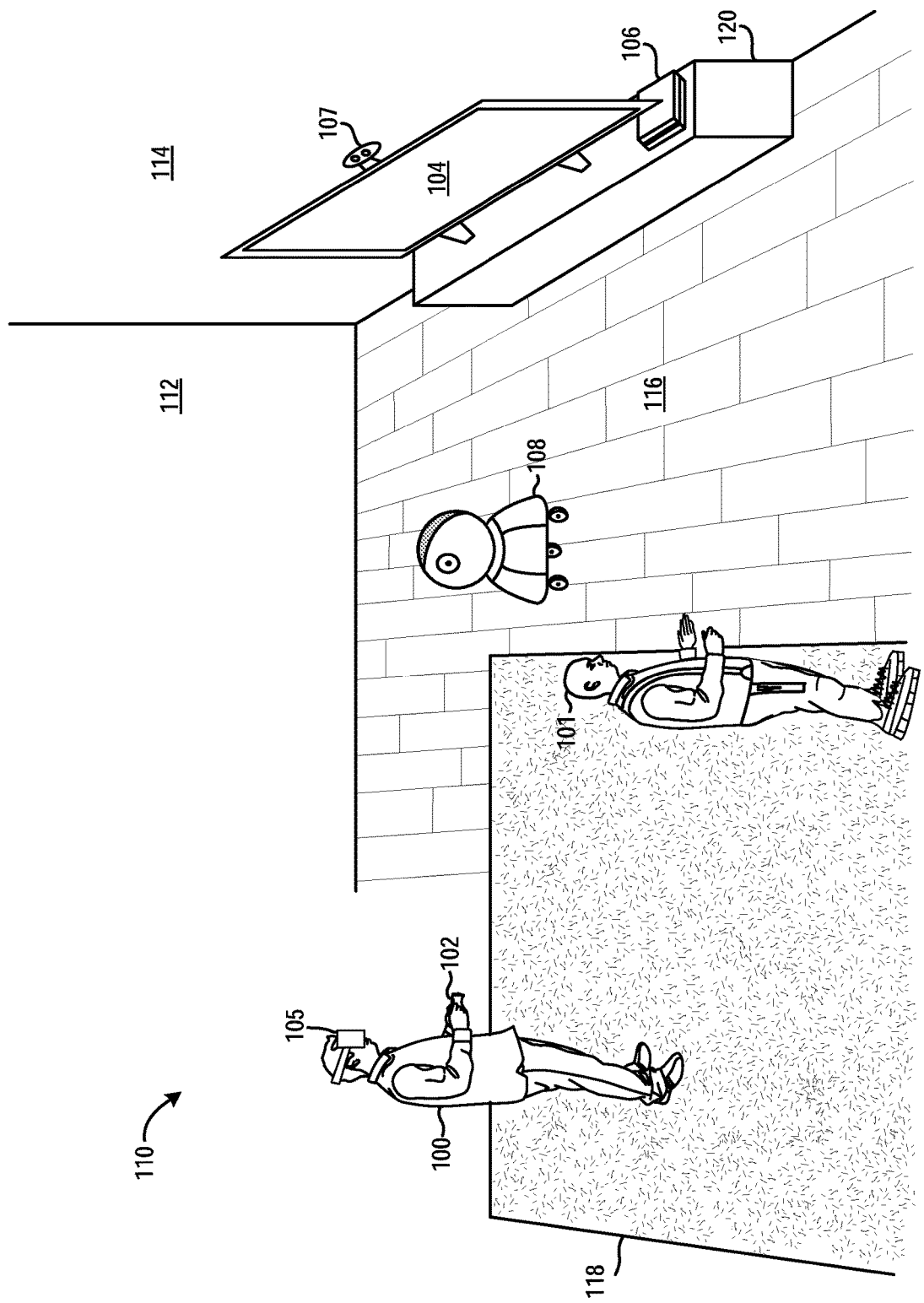
FIG. 1A illustrates a system for three-dimensional (3D) spatial and texture reconstruction viewed through a head-mounted display (HMD), in accordance with implementations of the disclosure.

FIG. 1A illustrates a system for three-dimensional (3D) spatial and texture reconstruction viewed through a head-mounted display (HMD), in accordance with implementations of the disclosure. In the illustrated implementation, a user 100 is shown interacting with a view of a virtual space/environment that is rendered on a head-mounted display 105. By way of example without limitation, one example of an HMD is the PlayStation®VR headset. In some implementations, the virtual space is that of a video game. In other implementations, the virtual space is that of any type of application or platform that provides a virtual space or virtual environment with which the user may interact, including without limitation, locally executed interactive applications, cloud executed applications, cloud platforms, social networks, websites, telecommunications platforms, video conferencing, online chatrooms, etc. It will be appreciated that such applications or platforms supporting a virtual space can be configured to accommodate multiple users interacting in the same virtual space simultaneously.

In some implementations, the interactive application (e.g. a video game) that generates the virtual space is executed by a local computing device 106. The computing device can be any kind of device that may be configured to execute the interactive application to generate the virtual space, including without limitation, a gaming console, personal computer, laptop computer, set-top box, tablet, cellular phone, portable gaming device, etc. In some implementations, the computing device 106 is connected to a network, such as a local area network, wide area network, WiFi network, cellular network, the Internet, etc.

In some implementations, the computing device 106 is a thin client that communicates over the network (e.g. the Internet) with a cloud services provider to obtain the view of the virtual space that is rendered on the HMD 105. That is, the interactive application is executed by the cloud services provider to generate the virtual space, and video data depicting the primary view of the virtual space is streamed over the network (e.g. the Internet) to the computing device 106, which then processes the video data to render the view to the HMD 105.

In some implementations, the functionality of the computing device 106 is incorporated into the HMD 105 or the display 104.

In order to interact with the virtual space that is viewed through the HMD 105, the user 100 may operate an input device 102. The input device 102 can be any type of device useful for providing input to interact with the virtual space, including without limitation, a controller, motion controller, keyboard, mouse, trackpad, pointer, joystick, gaming peripheral, etc. In some implementations, wherein the virtual space is of a video game, the input device 102 enables the user 100 to provide input to the video game, to effect changes in the game state of the video game, such as by controlling actions (e.g. of a character or other virtual object) in the video game's context of gameplay. By way of example without limitation, examples of input devices can include video game controller devices such as the DualShock®4 Wireless Controller, the PlayStation®Move Motion Controller, and the Playstation®VR Aim Controller.

In some implementations, an image capture device 107 is configured to capture images of the interactive local environment 110 in which the system is disposed. One example of an image capture device is the PlayStation®Camera. The computing device 106 can be configured to process and analyze the captured images to, by way of example without limitation, determine the location/orientation of an object in the local environment 101, such as the input device 102. In some implementations, the input device 102 may include a trackable feature, such as a light or other recognizable feature, that is recognized in the captured images and tracked, thereby providing for tracking of the location/orientation of the input device 102 in the local environment 101. Furthermore, images captured by the image capture device 107 may be analyzed to identify and track the user 100.

As noted above, because the user 100 is wearing the HMD 105, the user 100 is not able to see the local environment 110. Therefore, it is useful to capture and model the local environment, including any surfaces/objects within the local environment. Broadly speaking, this entails capturing and modeling the 3D spatial structures of surfaces/objects, and also capturing and modeling the textures of such surfaces/objects, so that a faithful representation of the local environment 110 can be rendered to the user 100. The process of capturing and modeling a 3D real space or object is known as 3D reconstruction. It will be appreciated that such a model of the local environment 110 can also have other uses, such as to enable a remote virtual reality user to experience the user 100's local environment 110 (e.g. enabling the remote virtual reality user is able to virtually "visit" the local environment 110 of the user 100), augmenting or altering a rendering of the local environment 110 with additional graphics or content, etc.

Broadly speaking, in accordance with implementations of the disclosure, a robot 108 is used to enable modeling of the local environment 110, including modeling the spatial structure of the local environment 110 and the textures of surfaces in the local environment 110. Such models can be used to render a view of a virtual space/environment (e.g. by the computing device 106) that is a 3D reconstruction of the local environment 110. This view can be presented through the HMD 105 to the user 100, to enable the user 100 to view the virtual space in a manner that simulates their real-world position in the actual local environment 110. That is, the location and orientation of the HMD 105 in the local environment 110 are tracked, and the view of the virtual space presented through the HMD 105 is rendered using the models of the local environment 110, with the location and orientation of the HMD 105 in the local environment 110 determining the perspective location and angular direction in the spatial model that are used to render the view of the virtual space, by way of example without limitation. In this manner, the view of the virtual space provided through the HMD 105 to the user 100 can mimic the real-world view as if the user 100 were viewing the actual local environment 110 without wearing the HMD 105.

In accordance with implementations of the disclosure, the robot 108 is utilized to spatially and texturally capture the local environment 110, to enable 3D reconstruction of the local environment 110. In the illustrated implementation, the local environment 110 is defined by a room in which the user 100 is situated. However, it will be appreciated that in other implementations the local environment 110 can be any other type of real space, setting or location in which the user 100 may be situated.

In accordance with implementations of the disclosure, the 3D reconstruction process entails generation of a point cloud, which is a set of data points that are defined by the 3D coordinates of points along the external surfaces of objects in the local environment. The point cloud is processed to define a polygon mesh, typically consisting of triangles, quadrilaterals, or other polygons. The polygon mesh is defined by a set of vertices, edges that connect the vertices, and faces that are the polygons formed from the edges. The vertices can include the data points of the point cloud, and/or other points that are determined based on the data points of the point cloud. The polygon mesh defines a 3D spatial model of the surfaces of the local environment. At rendering, textures are applied to the 3D mesh to form the rendered graphical depiction of the local environment.

As noted above, a robot 108 can be used to capture the materials of an object and enable the system to virtually recreate them. In this manner, it is possible to create a holographic space or recreate a real space in a virtual world that is as accurate as possible. With a moveable robot it is possible to obtain different images, e.g. at different angles and/or under different lighting conditions, that can overcome issues such as lighting conditions, glare, etc. so that the system can more accurately recreate textures of an object than that possible using a static camera or a camera taking a sweep of a room.

As used herein, "texture" refers to the properties of a real or virtual surface that characterize, affect or determine the surface's appearance. By way of example without limitation, such properties can include the 3D surface structure, color, reflectance, transparency, translucence, etc. In the context of computer graphics rendering, the application of texture to a virtual surface (e.g. a surface of a 3D model, such as a polygon of a polygon mesh) is referred to as texture mapping. Texture mapping can encompass many types of surface-defining techniques, including by way of example without limitation, diffuse mapping, height mapping, bump mapping, normal mapping, displacement mapping, reflection mapping, specular mapping, mipmaps, occlusion mapping, etc. It will be appreciated that texture mapping can utilize a procedural texture that creates a texture using a model or mathematical description. Such a model can be determined from captured data by the robot 108 in accordance with implementations of the disclosure described herein.

Thus, as shown in the illustrated implementation, the robot 108 is configured to capture the 3D spatial structure of the local environment 110, including by way of example without limitation, the spatial structure of any objects in the local environment 110 such as walls 112 and 114, the floor 116, a rug 118, the display 104 (e.g. a television), a media stand/cabinet 120, etc. To accomplish this, the robot 108 can be configured to scan the local environment 110 with one or more sensors, and from different locations within the local environment 110, to enable capture of the 3D spatial structure of the local environment 110.

For example, the robot 108 may include one or more depth cameras (or range imaging devices/sensors) that are capable of determining the distances of objects from the depth camera. It will be appreciated that the depth camera can be any kind of range imaging device, such as a time-of-flight camera (e.g. using controlled infrared (IR) lighting), LIDAR, a stereo camera (and using stereo triangulation), etc. Additionally, the robot 108 may include one or more image capture devices (e.g. visible light cameras) for capturing images/video of the local environment 110. Further, the robot 108 may include various motion sensors (e.g. accelerometers, gyroscopes, magnetometers, inertial motion units (IMU's), network positioning devices (e.g. GPS, WiFi positioning), etc. that can be utilized to track the position and orientation of the robot 108 within the local environment 110.

Utilizing such sensors, the robot 108 can map the 3D spatial structure of the local environment 110, by capturing images and data from various locations and/or as the robot 108 is moved throughout the local environment 110. In some implementations, the 3D spatial structure of the local environment 110 is modeled by generating a 3D model, such as a 3D point cloud and/or a polygon mesh model as described above. By way of example without limitation, the robot 108 may utilize any of various techniques for mapping or determining the 3D spatial structure, such as a simultaneous localization and mapping (SLAM) technique.

As noted, a texture is applied inside of a virtual space to a surface of a virtual object. When capturing texture, the goal is to capture the properties of a material to enable the system to recreate it as accurately as possible. In some implementations, the texture for a given surface is defined by a texture map, which may include one or more types of surface properties embodied in surface property maps. By way of example without limitation, these may include a displacement map (e.g. identifying crevices or other types of displacement in a surface), specular map (identifying shininess of a surface, and/or how a surface responds to lighting, glare, etc.), fresnel (for transparent/translucent objects, how light is reflected or refracted/transmitted by an object based on angle of view), etc. These types of surface texture properties can be captured by the robot 108 and accurately modeled and recreated. The ability of the robot 108 to capture images from different angles enables more accurate capture of a given surface's properties. Furthermore, as discussed in further detail below, the given surface may be captured under different and/or controlled lighting conditions to further enhance the accuracy of the textural capture of the surface.

In some implementations, a given surface in the local environment 110 is identified, and a representative portion of the identified surface is sampled to determine the texture of the surface. That is, the texture of the representative portion is captured and modeled, and when a virtual representation of the surface is rendered for viewing (e.g. through the HMD 105 or another display), the modeled texture is applied for the entirety of the surface.

In some implementations, prior to sampling a representative portion of a given surface, it is first determined that the surface, or a substantial portion thereof, has substantially the same or similar texture throughout. In other words, the surface is determined to have a substantially consistent texture throughout its area. By way of example without limitation, this may be ascertained by determining that the surface has a substantially consistent color or pattern of colors, reflectance, displacement, or other textural property. It will be appreciated that such a determination may be made at a lower or more approximate level of detail and/or sensitivity as compared to the level of detail/sensitivity that is to be applied when capturing the texture of the representative portion of the surface. For example, in some implementations, when evaluating a surface to determine whether it is of a consistent texture, fewer textural properties may be considered than when a representative sample is being texturally captured. In some implementations, for a given textural property, a lower resolution, sampling frequency, or per unit area level of discrimination is applied when evaluating the surface to determine whether it is of a consistent texture, as compared to when the given textural property is captured for a representative portion (or sample or region) of the surface. Thus, a determination is made as to whether the surface is substantially consistent in texture, and if so, then a representative portion of the surface is sampled to capture its texture in detail.

To determine whether a given surface (or portion/region thereof) is substantially consistent in texture, one or more threshold determinations may be applied. For example, in some implementations, a given surface may be determined to have a consistent texture if the sensed color of the surface (or a portion thereof), for example, as determined from analyzing captured images of the surface, varies by less than a predefined amount. In some implementations, a similar determination for other textural properties can be applied. In some implementations, multiple textural properties are evaluated, and it is determined whether the combined (e.g. weighted) variance of the properties is less than a predefined amount, and if so, then the surface (or portion thereof) is determined to have a consistent texture.

It should be appreciated that one or more regions of a given surface may be identified as having a similar or the same or consistent texture, and that a representative sample/portion of such regions can then be scanned in detail to capture the texture of such regions. Furthermore, object recognition can be applied to enhance the identification. For example, a vertical planar surface could be recognized as being a wall, and therefore identified for texture sampling. It will be appreciated that by sampling the texture of a representative portion of a surface, as the representative portion is much smaller than the entirety of the surface, resources are conserved because texture information for the entire surface need not be stored in order to provide realistic rendering of the surface in a virtual space. Rather, the sampled texture information can be applied, e.g. via a modeled texture map, for the entire surface when rendered. In this manner, a realistic rendering of the surface can be provided without requiring capture of detailed texture information for the entire surface, thus reducing memory storage requirements and speeding up the capture process as less surface area is required to be captured in detail, which reduces the amount of processing required as well.

With continued reference to FIG. 1A, for example, it may be determined based on captured images of the local environment 110 that the walls 112 or 114, the floor 116, and/or the rug 118, each have a substantially consistent texture throughout their respective surfaces. The robot 108 can be configured to capture the textures of representative portions of these surfaces in detail. For example, the robot 108 may capture in detail the texture of a representative portion of the floor 116, and model the texture. Then when the floor 116 is graphically rendered, it is rendered using the model of the texture to texture map the floor's virtual representation in the virtual space. A similar process can be applied for the other surfaces of the local environment 110.

It should be appreciated that any of the process operations described herein (including by way of example without limitation, processing of data, modeling of space/objects/textures, rendering of a view of a virtual space, etc.), unless specifically described or otherwise apparent from the present disclosure as being performed by a specific device, can be performed by any of the devices described herein, including by way of example without limitation, the robot 108, the computing device 106, the HMD 105, or a cloud computing device. For example, in some implementations, the capture and modeling of the local environment 110 is performed by the robot 108. Whereas in other implementations, the capture of the local environment 110 is performed by the robot 108 while the modeling of the local environment 110 is performed by the computing device 106. Not all permutations of the division of processing operations amongst the available devices in the systems of the present disclosure are described in detail herein. However, it will be appreciated that such permutations are within the scope of the present disclosure.

In some implementations, in order to allow spectators to see what the user 100 is seeing through the HMD 105, the view (or a portion thereof) that is rendered on the HMD 105 can also be rendered on the display device 104. Thus, the user 101 is able to spectate the user 100's view by viewing the display device 104. In some implementations, the robot 108 may project onto an available projection surface (e.g. a region of a wall) a secondary view of the virtual space.

Figure 1B:
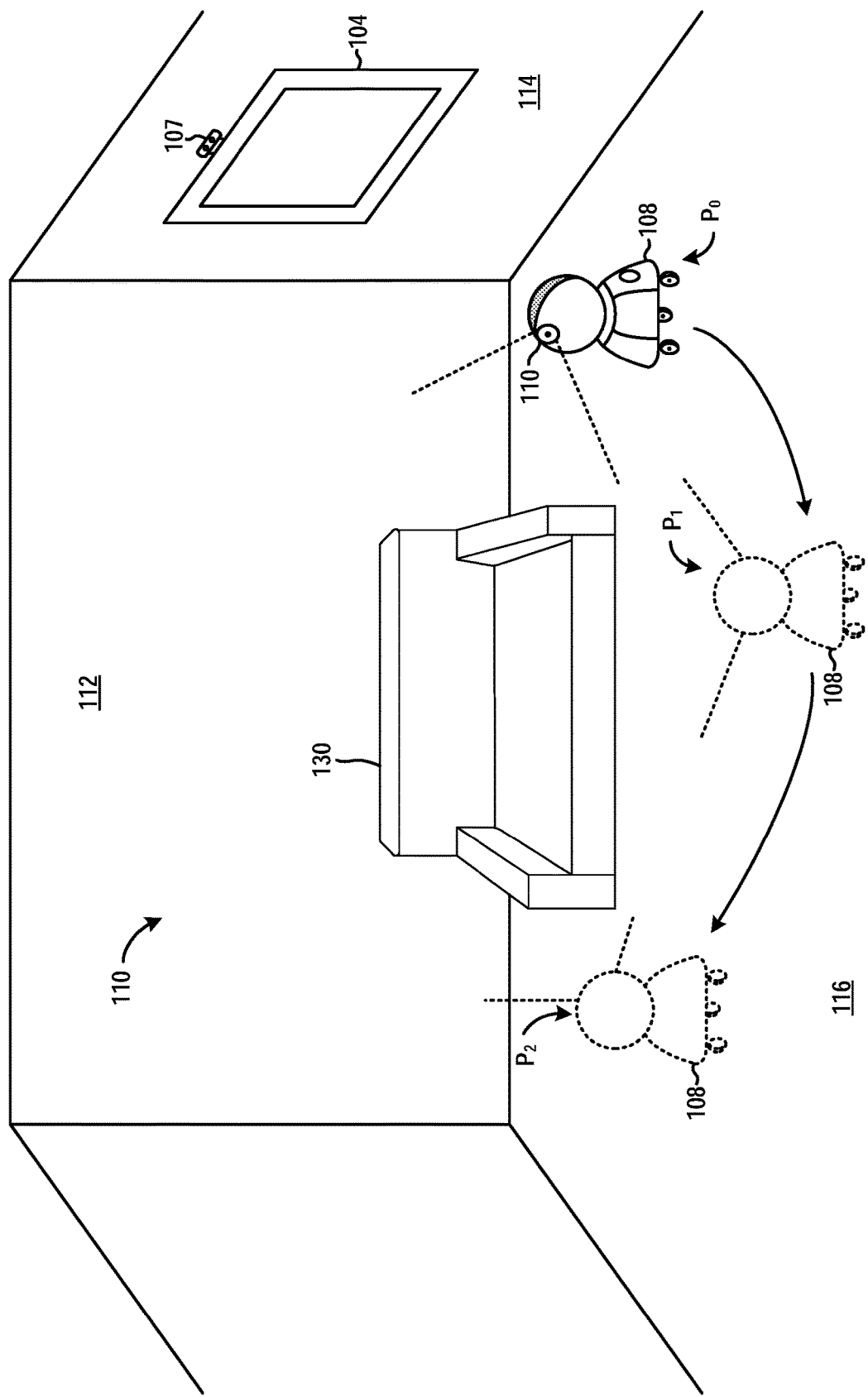
FIG. 1B illustrates a robot capturing an object from different angles, to enable 3D reconstruction of the object, in accordance with implementations of the disclosure.

FIG. 1B illustrates a robot capturing an object from different angles, to enable 3D reconstruction of the object, in accordance with implementations of the disclosure. In the illustrated implementation, an object 130 is a couch in the local environment 110. It will be appreciated that in various implementations the object 130 can be any other type of object in the local environment 110. In some implementations, the robot 108 is configured to capture the object 130 (e.g. using image sensors, depth cameras, or other sensors) from different locations, thereby capturing the object 130 from different angles. Using the captured information, the 3D structure of the object 130 can be modeled, e.g. using a polygon mesh model. Furthermore, the texture of the surfaces of the object 130 can be captured and modeled as well. It will be appreciated that by capturing the object 130 from multiple angles/directions, more accurate modeling of the 3D structure and surface texture is possible.

In some implementations, the object 130 is recognized based on an object recognition process, e.g. applied to captured images of the local environment 110 and/or captured depth information. Once recognized, the object 130 may be identified for further capture in greater detail from multiple directions using the robot 108.

In some implementations, the robot 108 is configured to capture the object 130 from a plurality of predefined angles/directions and/or distances. For example, the robot 108 may be configured to capture data at, by way of example without limitation, 45 degree intervals (e.g. zero, 45, 90, 135, 180, 225, 270, and 315 degrees). That is, the robot 108 moves around the object 130 to different positions in the local environment 110 corresponding to the predefined angular intervals, thus systematically changing the angle from which the object 130 is captured. In some implementations, the angle of capture can be defined relative to a determined center of the object 130 or another reference point of the object 130 or the local environment 110. In some implementations, the robot 108 is also configured to acquire multiple captures at a predefined distance from the object 130 or its determined center or other reference point. In various implementations the robot 108 can be configured to capture the object 108 from any plurality of angles, at any systematic intervals or otherwise. It will be appreciated that using multiple captures of the object 130 from different angles, then the 3D spatial structure of the object 130 and its surface texture can be better captured.

With continued reference to FIG. 1B, the robot 108 is shown at an initial position $P_0$, from which it captures the object 130. The robot 108 moves around the object 130 (e.g. laterally and/or circumferentially, relative to the object 130) to a position $P_1$, from which the robot captures the object 130. Then the robot 108 further moves around the object 130 to a position $P_2$, from which it captures the object 130. In capturing the object 130 from the various positions $P_0$, $P_1$, and $P_2$, the robot 108 obtains captured images, depth information, and/or other types of sensed information from different angles and perspectives surrounding the object 130. These can be analyzed to determine the 3D structure and textures of surfaces of the object 130.

In some implementations, the positions $P_0$, $P_1$, and $P_2$ are configured to be located along a circumference surrounding the object 130 at a predefined distance (e.g. radius from a center or other reference point of the object 130), and angularly separate from one another at predefined intervals as described above.

In some implementations, the robot 108 can be configured to affect the lighting of the object 130 to improve the capture of the object's structure and/or texture. For example, in some implementations, the robot 108 can include a light (or multiple lights) which may be operated to provide further illumination of the object 130. This may be useful in various situations, such as when ambient lighting conditions are low (e.g. below a predefined ambient light threshold), or when certain portions of the object 130 are poorly illuminated (e.g. regions of the object 130 that are in shadow), etc.

Figure 1C:
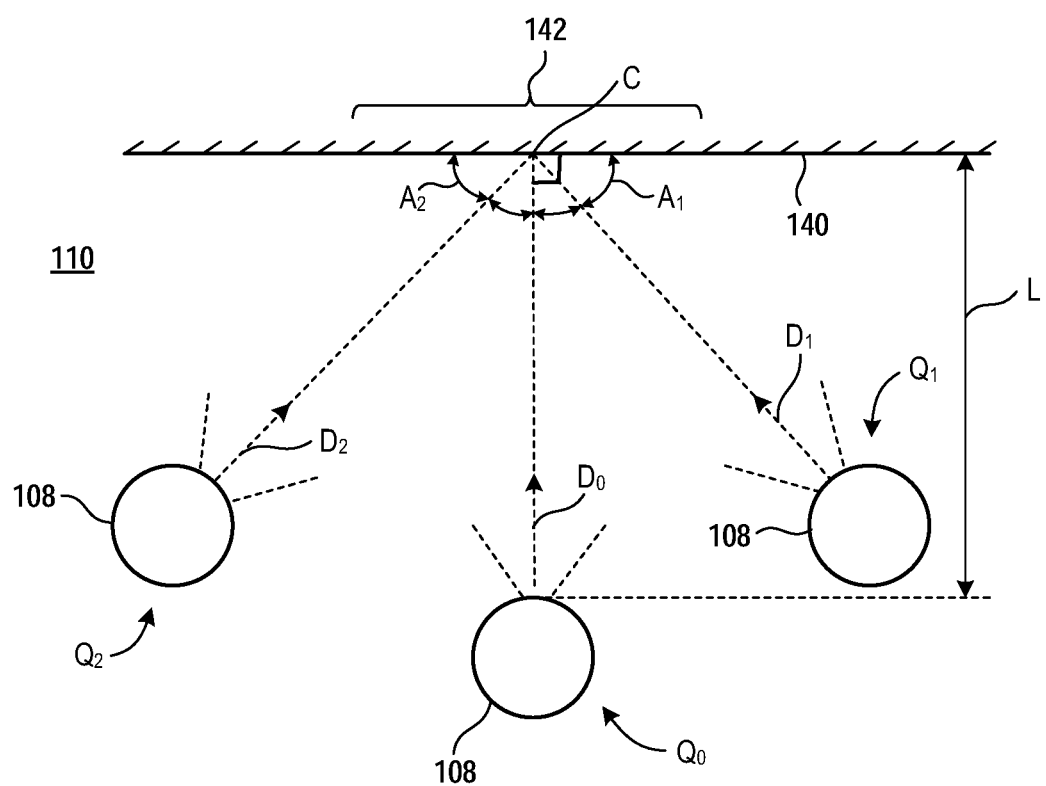
FIG. 1C conceptually illustrates an overhead view of a robot moving to various positions in a local environment to capture the texture of a surface, in accordance with implementations of the disclosure.

FIG. 1C conceptually illustrates an overhead view of a robot moving to various positions in a local environment to capture the texture of a surface, in accordance with implementations of the disclosure. As shown, and in accordance with some implementations, the robot 108 can be configured to identify a surface 140, and capture the texture of a representative portion 142 of the surface 140. In some implementations, capture of the texture entails capturing images of the representative portion 142 from predefined positions/orientations relative to the representative portion 142 of the surface 140.

For example, the robot 108 may move to a position $Q_0$ to capture one or more images of the representative portion 142, in a direction Do towards a center C of the representative portion 142, that is substantially normal/perpendicular to the surface 140. In some implementations, the position $Q_0$ is defined at a predefined distance L from the surface 140. Furthermore, the robot 108 may also capture images from a position $Q_1$, which is positioned so as to enable capture of images of the representative portion 142 in a direction $D_1$ (towards the center C of the representative portion 142) at a predefined angle $A_1$ relative to the surface 140 (or a predefined angle relative to normal to the surface 140). The robot 108 may also capture images from a position $Q_2$, which is positioned so as to enable capture of images of the representative portion 142 in a direction $D_2$ (towards the center C of the representative portion 142) at a predefined angle $A_2$ relative to the surface 140 (or a predefined angle relative to normal to the surface 140). As shown, the positions $Q_1$ and $Q_2$, and their corresponding angles $A_1$ and $A_2$, are on opposite sides of the center C of the representative portion 142. In some implementations, the positions $Q_1$ and $Q_2$ are also configured to be located at the same distance L from the center C of the representative portion 142; whereas in other implementations, they may be located at other distances.

By way of example without limitation, in some implementations, the predefined angle $A_1$ and/or $A_2$ is approximately 45 degrees relative to the surface 140. In effect, this means that images of the representative portion 142 of the surface 140 are captured from angles of approximately 45, 90, and 135 degrees, as measured from the same side of the representative portion 142. In other implementations, the predefined angle $A_1$ and/or $A_2$ is in the range of about 30 to 60 degrees, by way of example without limitation.

While in the foregoing implementation images of the representative portion 142 of the surface 140 are captured from three different angles, it will be appreciated that in other implementations, images of the representative portion 142 may be captured from any number of different angles. Furthermore, while in the foregoing implementation images are captured from positions that are substantially vertically aligned, in other implementations, images may be captured from positions that are not necessarily vertically aligned with each other. In such implementations, the robot 108 may be capable of maneuvering a camera to different elevations/heights, and articulating the camera to direct it towards the center of the representative portion of the surface.

Figure 1D:
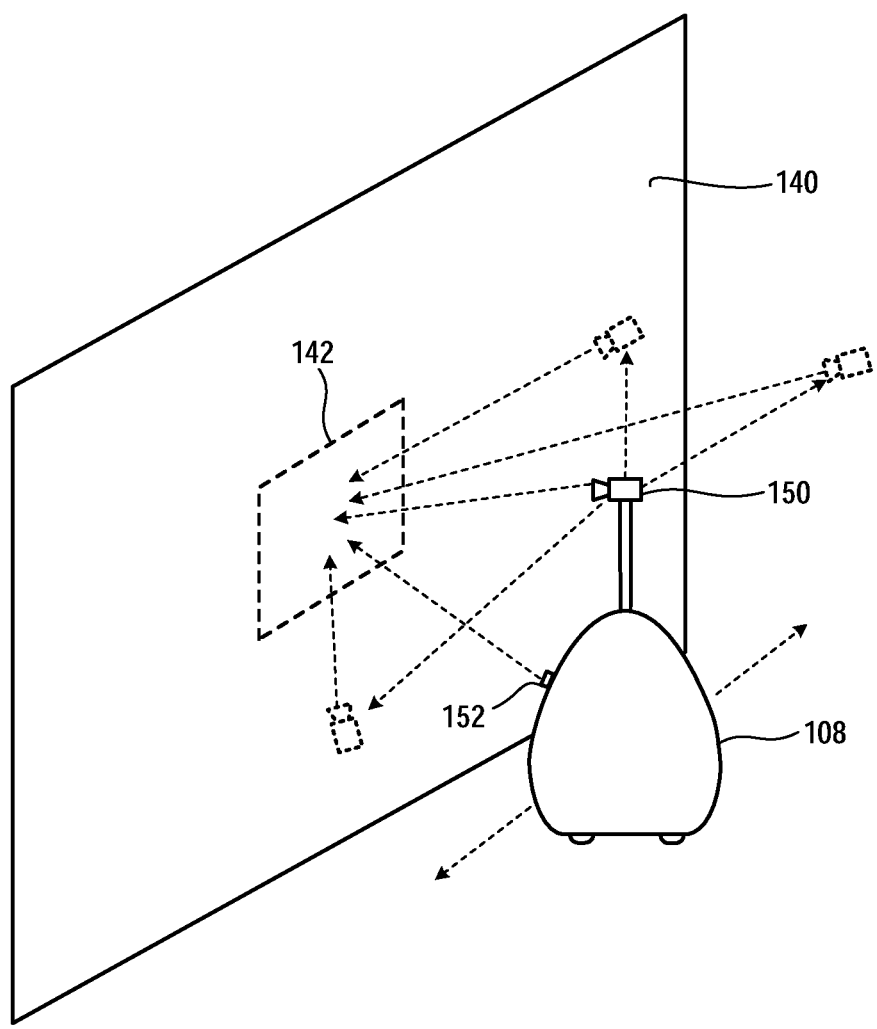
FIG. 1D illustrates a robot having multiple cameras capable of capturing images from multiple perspectives, in accordance with implementations of the disclosure.

FIG. 1D illustrates a robot having multiple cameras capable of capturing images from multiple perspectives, in accordance with implementations of the disclosure. As shown, the robot 108 includes a height-adjustable upper camera 150 that can be raised and lowered to different heights/elevations/vertical positions. The upper camera 150 is also articulated to enable adjustment of the angle of the camera 150. The robot 108 further includes a lower camera 152 that is positioned along the robot's body at a lower height than the camera 150. The lower camera 152 may also be articulated to enable adjustment of its angular direction. Thus, the cameras 150 and 152 can be operated (simultaneously) to capture images of a representative portion 142 of a surface 140 from different vertical positions. The upper camera can be adjusted up and down to capture images from additional different vertical positions.

As further shown in the illustrated implementation, the robot 108 can move laterally side-to-side relative to the surface 140 to enable capture of the representative portion 142 from different horizontal positions.

Utilizing images captured from various angles (and under various controlled lighting conditions) the robot 108 can more accurately capture the texture of the representative portion 142 of the surface 140. More specifically, the images captured from different angles and positions relative to the surface 140 can be analyzed to determine the texture of the surface 140, as defined by one or more texture maps that are generated based on the analysis and associated to the corresponding surface of the 3D model of the local environment 110. As noted above, this may include by way of example without limitation, diffuse mapping, height mapping, bump mapping, normal mapping, displacement mapping, reflection mapping, specular mapping, mipmaps, occlusion mapping, etc.

As images are captured from different locations within the local environment 110 as described above, it will be appreciated that the location and orientation of the robot 108 in the local environment 110 can be determined and tracked to enable a precise understanding of the perspective from which captured images are obtained. That is, the (3D) position and angular orientation of the robot 108 and/or an image capture device of the robot 108 can be determined in the local environment 110 and relative to the surface being captured.

In some implementations, the position/orientation of the robot 108 is determined, at least in part, based on information sensed or processed by the robot itself, including by way of example without limitation, data from motion sensors (e.g. accelerometers, gyroscopes, magnetometers, inertial motion units (IMU's), wheel sensors that sense movement of wheels of the robot 108, images captured by an image capture device of the robot 108, network positioning (e.g. GPS, WiFi positioning), simultaneous localization and mapping (SLAM), etc. In some implementations, the location/orientation of the robot 108 is determined, at least in part, based on analysis of images captured by the image capture device 107. In some implementations, the robot 108 includes one or more magnetic sensors configured to sense one or more magnetic fields emitted by one or more magnetic emitters positioned in the local environment 101, and the location/orientation of the robot 108 can be determined, at least in part, based on such data. Additionally, the robot 108 can be configured to sense its position/orientation based, at least in part, on having mapped and/or modeled the 3D structure of the local environment 110, e.g. using object recognition and correspondence to the modeled environment to determine position/orientation.

In some implementations, for purposes of capturing the texture of a representative portion of a surface in the local environment 110, the position of the robot 108 relative to the representative portion of the surface is determined and tracked. For example, the robot 108 may use any of the above-described methods for tracking position/orientation to specifically track its position/orientation relative to the representative portion of the surface. Further, the robot 108 may specifically track the representative portion and/or the surface. By tracking the position/orientation relative to the representative portion of the surface, captured images of the representative portion can be properly analyzed (e.g. corresponding points can be determined).

As noted, in some implementations, the robot 108 can include a light which can be used to illuminate a surface for texture capture. In some implementations, such a light is used to illuminate a representative portion of the surface, and using the known angle of illumination by the light striking surface, captured images from a known perspective/vantage point can be analyzed to determine the texture of the surface.

Figure 2:
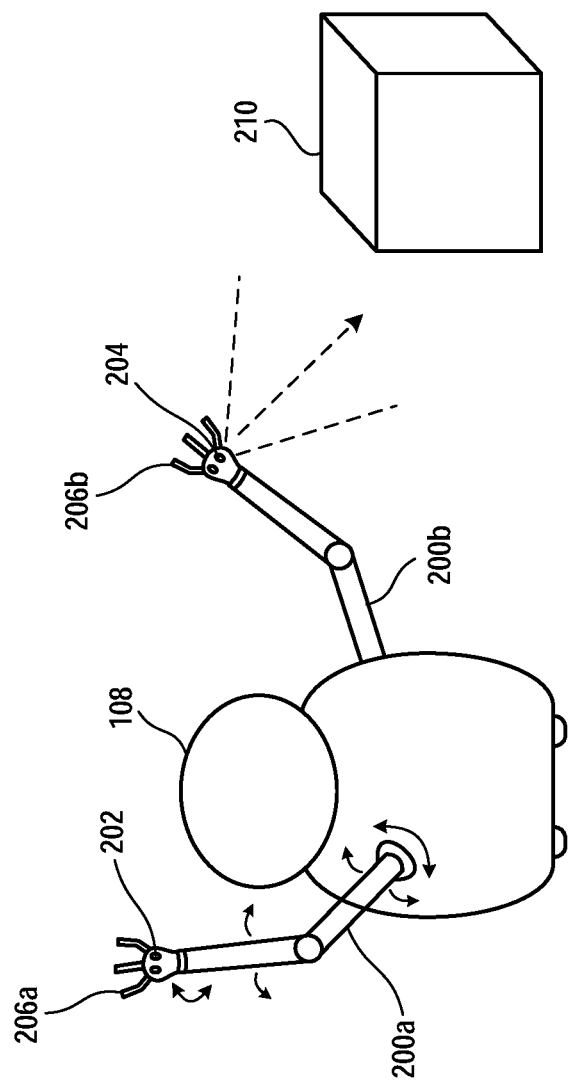
FIG. 2 illustrates a robot configured to capture an object to enable 3D reconstruction of the object, in accordance with implementations of the disclosure.

FIG. 2 illustrates a robot configured to capture an object to enable 3D reconstruction of the object, in accordance with implementations of the disclosure. In the illustrated implementation, the robot 108 includes arms 200a and 200b, each of which has multiple articulated joints that enable the arms 200a and 200b to be maneuvered in practically any direction. In some implementations, the arms 200a/b are further extendable. The arms 200a and 200b may include one or more lights, and one or more cameras, which may be maneuvered by maneuvering the arms 200a and 200b.

In the illustrated implementation, the arm 200a includes a light 202 that is activated to provide illumination, and the arm 200b includes a camera 204 configured to capture images. In some implementations, the light 202 is maneuvered while the camera 204 remains in a fixed position and orientation, capturing images as the angle of the lighting provided by the light 202 changes. In other implementations, the light 202 is held in a fixed position and orientation, while the camera 204 is maneuvered, changing the angle of the camera as the lighting is held steady. In still other implementations, both the light 202 and the camera 204 can be maneuvered, either in turn or even simultaneously, as the light 202 is activated and as the camera 204 captures images of an object or surface.

In the illustrated implementation, the camera 204 is being used to capture images of the object 210, while the lighting is controlled by using the light 202 to illuminate the object 210. It will be appreciated that by capturing images of the object 210 from different angles and using lighting from different angles, a more robust modeling of the structure and texture of the object 210 can be achieved.

Another way that the robot 108 may influence the lighting of the object 210 (or a given surface in the local environment 110) is by producing shadows. In some implementations, the robot 108 may be configured to maneuver itself so as to produce a shadow falling on the object 210. In other words, the robot 108 may move to position in the local environment 110 that places it between the object 210 and a light source, so as to physically block at least a portion of the light from the light source from illuminating the object 210 or a given surface. In this manner, the robot 108 may reduce the illumination of the object 210.

Additionally, in some implementations, the robot 108 is configured to physically maneuver an object to enable capture of its structure and texture. In the illustrated implementation, the arms 200a and 200b include claws 206a and 206b, respectively, which can be used to grip and maneuver the object 210, changing its orientation or position relative to the robot 108 so that the robot 108 can capture images (or other sensed data) of different portions of the object 210, and capture images/data from different angles and positions relative to the object and its surfaces.

Figure 3:
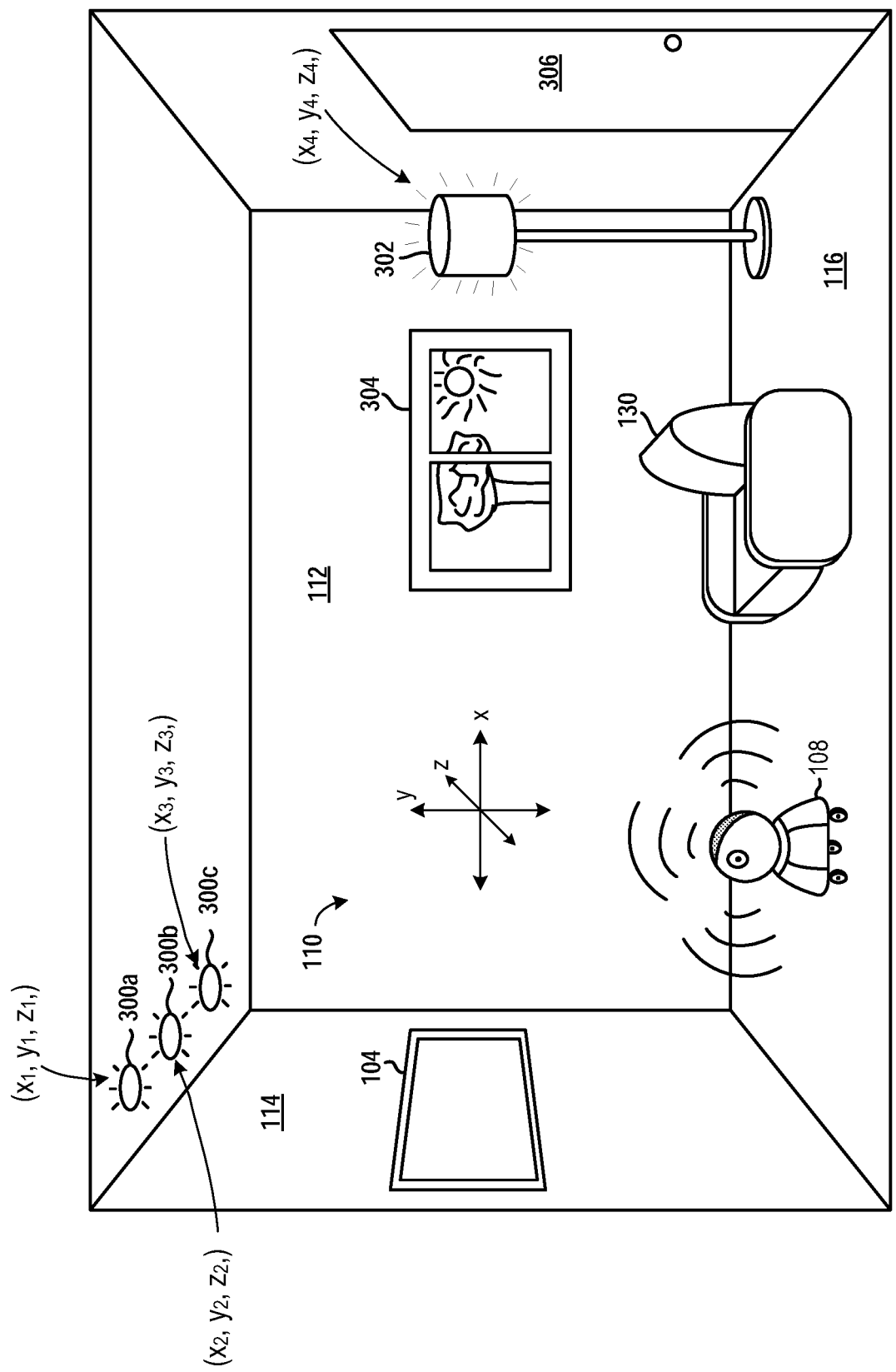
FIG. 3 illustrates a robot 108 in a local environment having various features including controllable lights, in accordance with implementations of the disclosure.

FIG. 3 illustrates a robot 108 in a local environment having various features including controllable lights, in accordance with implementations of the disclosure. In the illustrated implementation, the local environment 110 is defined by a room in which the robot 108 is disposed. The room further includes a number of lights that are remotely controllable through a lighting control system. As shown, lights 300a, 300b, and 300c are in the form of recessed ceiling lights, while light 302 is in the form of a lamp. In various implementations, there may be any number and type of lights that are remotely controllable through a lighting control system. In some implementations, the lighting control system is a home automation system. In some implementations, the lighting control system is wirelessly accessible over a home network, such as a WiFi network, or using other wireless technologies, such as Bluetooth communications. In some implementations, the lighting control system is defined by one or more smart devices that enable control of the lights, such as a smart switch or smart outlet. In some implementations, the lights themselves are smart devices capable of networked communication, or the lights include smart bulbs that are similarly capable of networked communication.

In some implementations, the robot 108 communicates with the lighting control system to control the state of the lights, including the on/off state and the intensity of the lights. For example, the robot 108 may communicate over a WiFi network with the lighting control system to adjust the intensity of the various lights. More specifically, the robot 108 may control the lights so as to provide more or less illumination for purposes of capturing the 3D spatial structure and textures of the local environment 110. This can be useful in overcoming adverse lighting conditions when attempting to capture the local environment 110.

For example, there may be a window 304 through which high intensity light, such as direct or indirect sunlight, enters the room. The high intensity of the light coming through the window 304 can lead to high contrast in the local environment 110 and strong shadows or other effects that may make it difficult for image sensors to accurately capture the structures and textures of the local environment 110. In another scenario, the lighting in the local environment 110 may be inadequate or less than optimal for image capture of at least some objects or surfaces by the robot 108 (e.g. requiring high gain by an image sensor, which tends to be noisy). In yet another scenario, there may be too much light for image capture of at least some objects or surfaces or regions thereof.

Therefore, the robot 108 can be configured to communicate with the lighting control system to adjust the on/off state and/or intensity of various ones of the lights to overcome such lighting issues. In some implementations, the robot 108 communicates with the lighting control system to turn on/off and/or adjust the intensity of one or more lights in order to normalize the lighting condition to the extent possible, for the local environment 110 and/or for one or more objects or surfaces in the local environment 110 and/or for a sub-region thereof. It will be appreciated that normalization of lighting can be variously defined in various implementations. For example, in some implementations, normalization of lighting is defined by a target amount (or target range) of light in the local environment 110 or for a region/object/surface thereof. In some implementations, normalization of lighting is defined by a target level or target range of contrast or dynamic range. In some implementations, normalization of lighting is defined with reference to a selected region of space in the local environment 110, or a region that is captured by an image capture device of the robot 108.

It will be appreciated that for purposes of normalizing the lighting condition, the amount of light or the lighting condition can be measured or determined using one or more light sensors and/or image capture devices of the robot 108.

In some implementations, the robot 108 is configured to determine the locations of lights within the local environment 110, and use the locations to affect the lighting in the local environment 110. For example, in the illustrated implementation, the locations of lights 300*a/b/c* and 302 may be determined to have 3D coordinates $(x_1, y_1, z_1)$, $(x_2, y_2, z_2)$, $(x_3, y_3, z_3)$, and $(x_4, y_4, z_4)$, respectively. In some implementations, the robot 108 may determine the locations of the lights based on analyzing captured images, captured depth data, and further based on controlling the on/off state and/or intensity level of the lights through the lighting control system.

Using the known locations of the lights, the robot 108 may control their illumination so as to affect the lighting in the local environment 110 in a desired manner. For example, when capturing the texture of a surface, one or more of the lights can be controlled so as to increase or decrease the amount of illumination provided by the lights, and the direction of illumination by a given light relative to the surface can be determined from the known positions of the lights and the orientation and position of the surface being examined. Different lights can be controlled to provide different lighting amounts from different directions, enabling capture of more complete texture data for the surface. Furthermore, illumination can be provided from specific directions based on the known locations of the lights, to overcome issues such as insufficient lighting in particular regions of the local environment 110.

In some implementations, a device such as the HMD 105 or controller 102 may be tracked based on detection of a magnetic field. The magnetic field may be emitted by a peripheral device in the local environment 110, which in some implementations may be connected to, and/or controlled by, the computing device 106. In some implementations, the magnetic field is emitted by an emitter included in the image capture device 107. It will be appreciated that the presence of other magnetic sources and/or materials or devices exhibiting magnetic properties that substantially affect or interfere with the emitted magnetic field, may interfere with the aforementioned magnetic tracking.

Therefore, with continued reference to FIG. 3, in some implementations, the robot 108 is configured to map the magnetic properties of the local environment 110. More specifically, the robot 108 can be configured to determine the magnetic properties of the local environment 110 to identify regions where magnetic interference may occur. In some implementations, the robot 108 maps the ambient magnetic properties of the local environment 110 by navigating throughout the local environment 110 while sensing magnetic fields (e.g. using one or more magnetometers). In some implementations, the robot 108 detects the magnetic properties (e.g. magnetic susceptibility, magnetic permeability, etc.) of specific objects in the local environment 110, which may be identified using a previously constructed 3D spatial map of the local environment 110.

Using the identified magnetic properties of the local environment 110, including those of any specific objects in the local environment 110, the system can model their effect on the emitted magnetic field that is to be used for magnetic tracking. And therefore the magnetic tracking can be made more accurate using the modeled effects of the identified magnetic properties of the local environment 110.

In some implementations, the robot 108 may use its spatial map of the local environment 110 to calibrate detection of the emitted magnetic field for magnetic tracking. That is, the emitted magnetic field can be provided, and the robot can detect the emitted magnetic field (e.g. field strength) at various positions throughout the local environment 110. Simultaneously, the robot 108 determines the position of the magnetic emitter and its own position relative to the magnetic emitter using its spatial map and/or other non-magnetic techniques (e.g. image recognition and tracking, depth-based tracking, etc.). The detected magnetic field by the robot 108 is correlated to the robot's determined position using the non-magnetic techniques. In this manner, a mapping of the emitted magnetic field that is specific to the local environment 110 can be determined.

In some implementations, by mapping the magnetic properties of the local environment 110, the system can identify and recommend to a user a specific region that is preferred for magnetic tracking, and/or identify and inform the user about a specific region that should be avoided for magnetic tracking.

Figure 4:
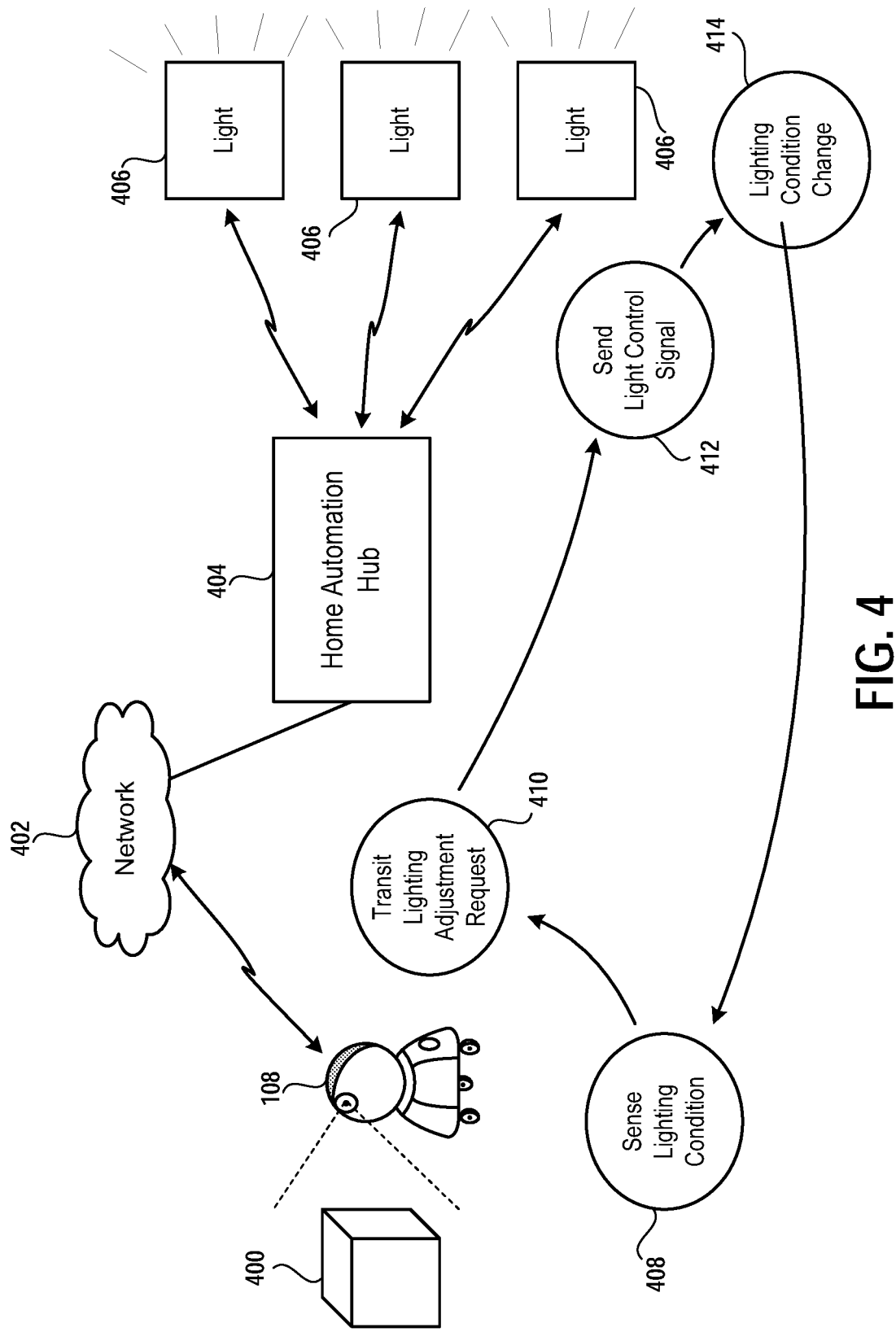
FIG. 4 conceptually illustrates a system for adjusting lighting conditions in a local environment, in accordance with implementations of the disclosure.

FIG. 4 conceptually illustrates a system for adjusting lighting conditions in a local environment, in accordance with implementations of the disclosure. In the illustrated implementation, the robot 108 is capable of communicating over a network 402 with a home automation hub 404. In some implementations, the network 402 is defined by a WiFi network. In some implementations, the network 402 can include any of various kinds of wireless and/or wired networks, through which the robot 108 can communicate with the home automation hub 404.

The home automation hub 404 is a device that is capable of communicating over the network 402, and also capable of communicating with the lights 406, which are lights in the local environment 110 that are capable of being controlled to affect the lighting conditions in the local environment 110. In some implementations, the home automation hub 402 communicates with the lights 406 over a home automation communication protocol or standard, such as Universal Powerline Bus, Insteon, Z-wave, Zigbee, WiFi, Bluetooth, Thread, Homekit, etc. The home automation hub 404 is capable of communicating over the appropriate protocol so as to control the illumination provided by the lights 406, and may control aspects such as the on/off state, the light intensity setting, and the color of the lights 406, in accordance with their capabilities.

With continued reference to FIG. 4, as shown at reference 408, the robot 108 senses the lighting condition in the local environment 110. This may include sensing the lighting condition of a particular object 400 in the local environment 110, a surface, a region, or other portion of the local environment 110. Based on this initial sensed lighting condition, the robot 108 may determine that the lighting condition should be adjusted, so as to improve the lighting condition, for example, for purposes of capturing the texture of the object 400 or a surface in the local environment 110. In some implementations, as noted above, the robot 108 determines whether the current sensed lighting condition meets a target lighting condition, which in some implementations may be defined by meeting a minimum, a maximum, or a range, for a measured lighting condition parameter. In response to determining that the lighting condition should be adjusted, the robot 108 sends a request over the network 402 to the home automation hub 404 to adjust the lights 406, as shown at reference 410.

In response to the request, the home automation hub 404 sends one or more control signals to the lights 406 (e.g. using a home automation protocol), as shown at reference 412, thereby affecting the states of the lights 406 in some manner, such as by turning a given light on or off, adjusting its intensity, and/or adjusting its color. Then as shown at reference 414, the lighting condition in the local environment 110 changes, and returning to reference 408, the robot 108 senses the new lighting condition in the local environment 110.

While in the above implementation, the robot 108 communicates over the network 402 with the home automation hub 404, in some implementations, the robot 108 communicates directly with the home automation hub 404. In still other implementations, the robot 108 may communicate directly with the lights 406 to adjust their illumination settings, and thereby control the lighting conditions in the local environment 110.

Figure 5:
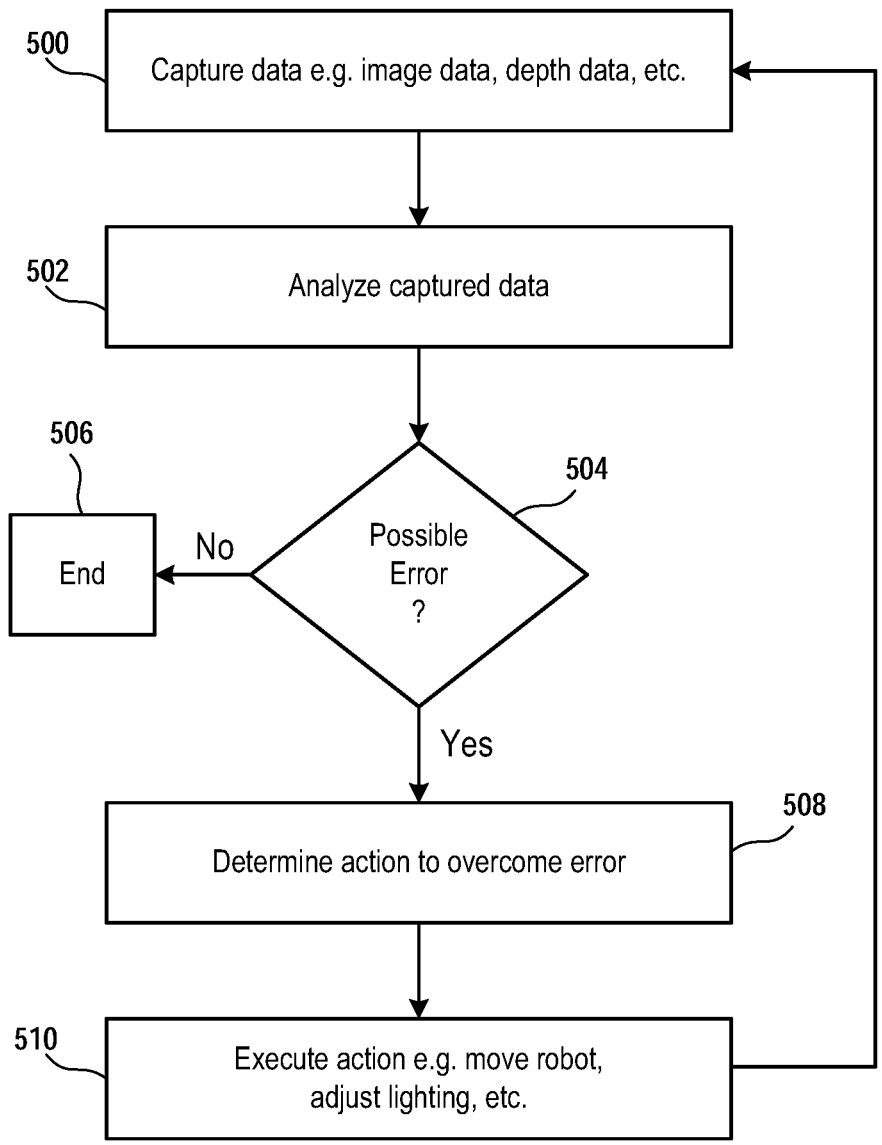
FIG. 5 illustrates a method for using a mobile robot to overcome possible errors when capturing spatial and texture data in a local environment, in accordance with implementations of the disclosure.

FIG. 5 illustrates a method for using a mobile robot to overcome possible errors when capturing spatial and texture data in a local environment, in accordance with implementations of the disclosure. At method operation 500, data is captured by from one or more sensors or spatial/textural data capture devices of the robot 108. By way of example without limitation, and as described elsewhere herein, this may include capturing image data by an image capture device, capturing depth data by a depth camera, etc. Such data capture can be for the purpose of capturing the spatial structure and/or texture of the local environment 110 or any region/object/surface therein.

At method operation 502, the captured data is analyzed. More specifically, the captured data is analyzed to determine whether or not there are possible errors in the captured data. In some implementations, this entails analyzing the captured data to identify portions that are suspect, such as by identifying discontinuities in the captured data or other aspects of the captured data. In some implementations, this entails determining a degree of confidence for a given portion of the captured data, and determining whether the degree of confidence satisfies a predefined threshold. In other words, if the degree of confidence does not satisfy (e.g. exceed) the predefined threshold, then there is a probable error for the portion of the captured data under consideration.

For example, in a captured image a portion of a surface that is all white (or all of a high or maximum intensity, e.g. exceeding a threshold intensity level) may be because the portion is indeed the color white, but might also result from the presence of glare or a specular reflection of some kind. Or as another example, in captured depth data, a region for which depth data is missing may be because of an opening in the overall spatial structure (e.g. doorway), but might also result from a window or other transparent structure, or a reflective surface that deflects the depth camera's beam, that is present but not detected by the depth camera. Depth cameras are known to be susceptible to noise (e.g. from reflections and/or features that are difficult to capture), and hence depth data may include erroneous measurements. Thus, it is desirable to identify and resolve such potential errors using the capabilities of the robot 108.

At method operation 504, it is determined whether a possible error exists. If not, then at method operation 506 the method ends. However, if a possible error exists, then at method operation 508, one or more actions are identified/determined for overcoming the error (e.g. clarifying whether an error actually exists). At method operation 510, the determined action is executed by the robot 108 to resolve the possible error. By way of example without limitation, such corrective actions may include one or more of the following: moving the robot 108 to a new position/orientation (e.g. to obtain an image or capture data from a different angle and/or distance), moving a sensor device of the robot 108 (e.g. by adjusting a telescoping or articulating arm of the robot), adjusting the lighting (e.g. by adjusting a light of the robot, adjusting lighting through a home automation system), etc.

Following performance of the determined action, then the method returns to method operation 500, to capture data using the robot 108 again. Hence, the method can be repeated until there is no longer a probable error, or until the captured data is accurate to a satisfactory degree of confidence.

Using the aforementioned spatial and texture models of the local environment 110, it is possible to 3D reconstruct the local environment 110, and render highly realistic views of the local environment 110 on a display, such as the display of the HMD 105. This can ease the transition into and out of virtual reality for the user 100, as they may be provided with views of a virtualized version of the local environment 110 when initially putting on and/or just prior to taking off the HMD 105. Furthermore, unique experiences can be provided to the user 100, such as by allowing another remote user to enter their virtualized local environment, providing an experience similar to interacting with another user in the local environment 110 even though the other user is not physically present.

Figure 6:
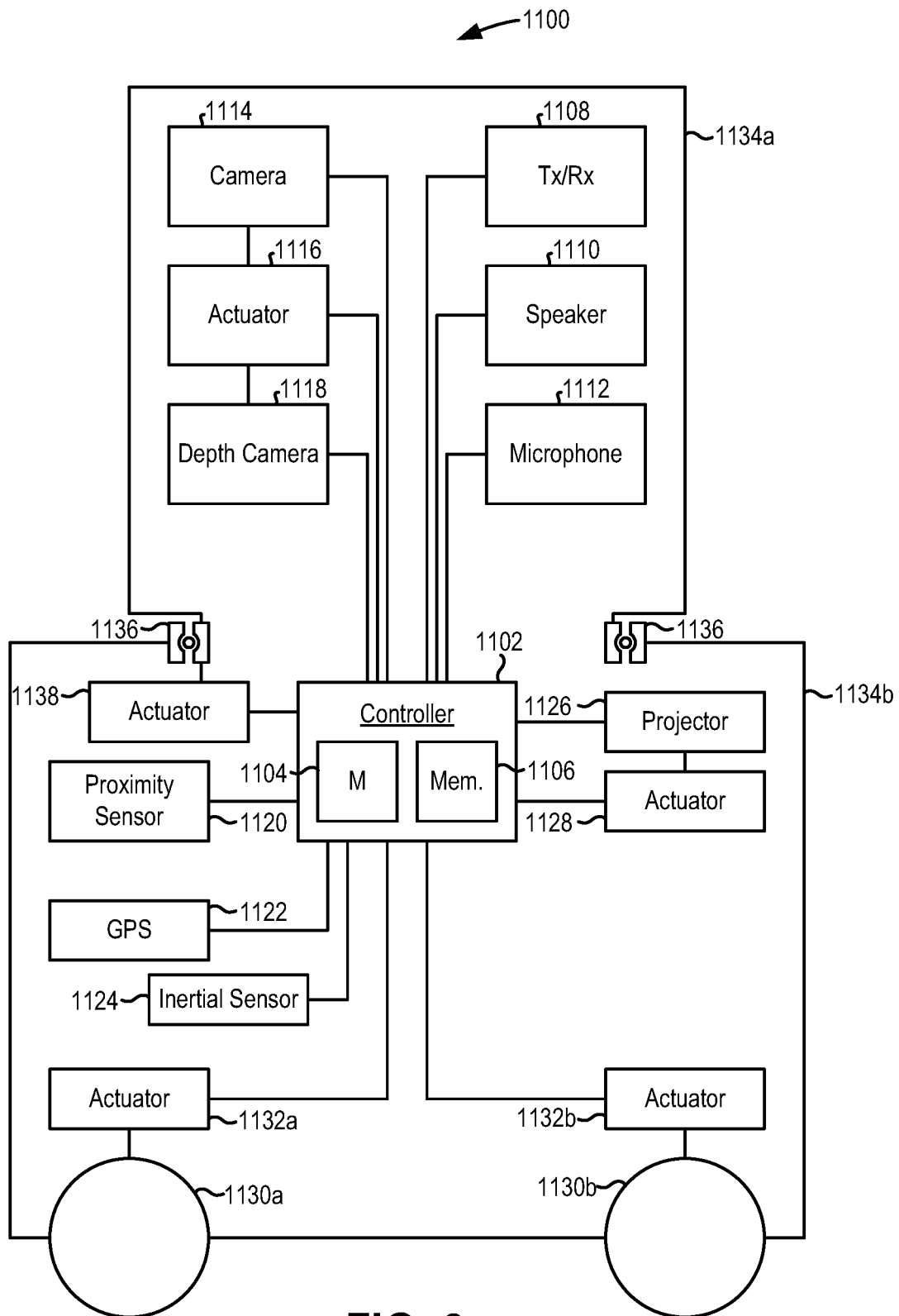
FIG. 6 is a schematic diagram conceptually illustrating components of a robot, in accordance with implementations of the disclosure.

FIG. 6 is a schematic diagram conceptually illustrating components of a robot, in accordance with implementations of the disclosure. As shown, the robot 1100 includes a controller 1102 that is configured to control various devices of the robot and the operations performed by the robot 1100, including processing data and instructions, and issuing commands to various devices of the robot 1100 to cause the robot to move, capture images/audio/video, render images/audio/video, or perform any other function of which the robot is capable, as described in the present disclosure. The controller 1102 includes one or more processors 1104 (e.g. microprocessor, general purpose processor (GPP), application specific processor (ASP), central processing unit (CPU), graphics processing unit (GPU), complex instruction set computer (CISC), reduced instruction set computer (RISC), application specific integrated circuit (ASIC), digital signal processor (DSP), etc.) configured to execute program instructions, and one or more memory devices 1106 (e.g. volatile memory, non-volatile memory, random access memory (RAM), read-only memory (ROM), SRAM, DRAM, flash memory, magnetic memory, hard disk, optical disc, etc.) configured to store and retrieve data.

A transceiver 1108 is configured to transmit and/or receive data, via a wireless or wired connection. The transceiver 1108 may communicate over one or more networks and use any of various data communications protocols known in the art, including by way of example without limitation, IP-based protocols, Wi-Fi, Bluetooth, NFC, Zigbee, Z-Wave, ANT, UWB, Wireless USB, Sigfox, cellular networks (2G/3G/4G/5G networks, LTE networks, etc.), infrared protocols (e.g. IRDA protocols), etc.

The robot 1100 includes one or more speakers 1110 that are capable of emitting any kind of audio, including by way of example without limitation, sounds from a virtual environment being rendered by the robot 1100, music, speech, audio from a media presentation (e.g. television program, movie, show, etc.), etc.

The robot 1100 includes one or more microphones 1112, that are configured to capture sound from the local environment in which the robot is disposed. A plurality of microphones may permit greater sensitivity in a greater number of directions simultaneously. In some implementations, the microphones 1112 are configured in an array or other predefined positioning arrangement, so that signals from the microphone array can be analyzed to determine directionality of audio sources relative to the microphone array.

The robot 1100 includes one or more image capture devices/cameras 1114 configured to capture images/video from the local environment. Multiple image capture devices can be employed to enable simultaneous coverage of a larger region or multiple regions of the local environment and/or improved environment mapping, depth analysis, by way of example without limitation.

The one or more cameras 1114 can be directed by one or more actuators 1116, to enable the direction of a given camera to be adjusted. Actuators 1116 can be configured to rotate, translate, raise, lower, tilt, pan, or otherwise move or change the orientation of the cameras 1114.

The robot 1100 includes one or more depth cameras 1118. A depth camera is capable of capturing depth/ranging information about objects in the local environment. In some implementations, the depth camera 1118 is a time-of-flight camera that determines distance based on the time-of-flight of a controlled light signal to various points in the local environment.

Similar to the cameras 1114, the depth cameras 1118 can be directed by one or more actuators 1116, which may be the same or different actuators as those that direct the one or more cameras 1114.

The robot 1100 includes one or more proximity sensors 1120, that are capable of detecting proximity of the robot to nearby objects. The proximity sensors 1120 can be mounted at various locations on the robot 1100, to enable proximity detection for corresponding portions of the robot 1100. For example, in some implementations, at least one proximity sensor is mounted at a lower portion of the robot 1100 to enable proximity detection in this vicinity, such as to provide detection of objects nearby to the lower portion of the robot (e.g. objects on the floor/surface on which the robot 1100 is situated). In some implementations, one or more proximity sensors are mounted along other portions of the robot 1100, including middle and upper portions of the robot. Proximity sensors 1120 can be useful for avoiding collisions of the robot 1100 with objects in the local environment, detecting the presence of nearby objects, detecting gestures by a user in the vicinity of the robot, etc.

The robot 1100 includes a global positioning system (GPS) device/receiver 1122, that is configured to receive information from GPS satellites for determining the geolocation of the robot 1100.

The robot 1124 includes one or more inertial/motion sensors 1124 that are capable of detecting movement and/or orientation of the robot 1124. Examples of inertial/motion sensors include accelerometers, magnetometers, gyroscopes, etc.

The robot 1124 includes at least one projector 1126 that is capable of projecting images/video onto surfaces in the local environment. By way of example without limitation, the projector can be an LCD projector, LED projector, DLP projector, LCoS projector, pico projector, etc.

The robot 1100 includes a plurality of wheels/rollers, e.g. wheels/rollers 1130a and 1130b as shown, that are configured to enable the robot 1100 to move about the local environment. One or more of the wheels/rollers can be controlled by actuators (e.g. actuators 1132a and 1132b) to cause the wheels/rollers to rotate and thereby effect movement of the robot 1100. In some implementations, wheels/rollers can be multi-directional or omnidirectional, that is, capable of producing or facilitating movement in more than one direction or all directions.

The various components of the robot 1100 can be contained within a housing. In the illustrated implementation, an upper housing 1134a and a lower housing 1134b are included. The upper housing 1134a is configured to be rotatable relative to the lower housing 1134b, facilitated by a plurality of bearings 1136. In some implementations, an actuator 1138 is configured to rotate the upper housing 1134a. In various implementations, any of the various components of the robot 1100 can be mounted to or within the upper housing 1134a, and configured to be rotated/moved when the upper housing 1134a is rotated, while others of the various components are mounted to or within the lower housing 1134b and not simultaneously rotated.

By way of example, in some implementations, the camera 1114, depth camera 1118, speaker 1110, and/or microphone 1112 is/are mounted to the upper housing 1134a, while the projector 1126 is mounted to the lower housing 1134b. The components mounted to the upper housing 1134a can be rotated with the upper housing 1134a, independent of the projector 1126. This can enable the robot 1100 to direct the projector 1126 independently of the camera 1114, depth camera 1118, speaker 1110, and/or microphone 1112. For example, this may be useful to allow the camera 1114, depth camera 1118, speaker 1110, and/or microphone 1112 to be directed towards a user, while the projector 1126 is directed towards a wall or other projection surface.

FIGS. 7A-7G illustrate various types of robots, in accordance with implementations of the disclosure.

Figure 7A:
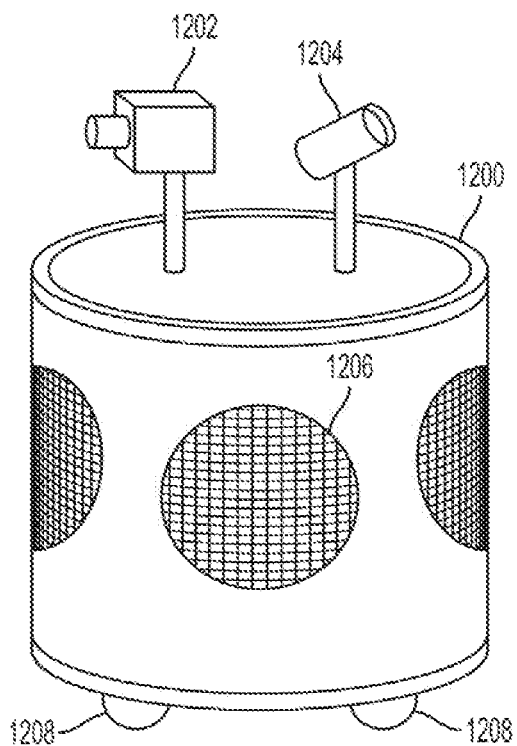

FIG. 7A illustrates a robot having a cylindrical shaped body 1200, in accordance with implementations of the disclosure. A projector 1202 and a camera 1204 are mounted to respective poles that are extendable and/or rotatable in accordance with implementations of the disclosure. The robot may include a plurality of speakers 1206 that enable the robot to emit audio in multiple directions. Though not specifically shown, the robot may also include a down-firing speaker. The robot further includes wheels 1208 for propulsion/movement of the robot about the local environment.

Figure 7B:
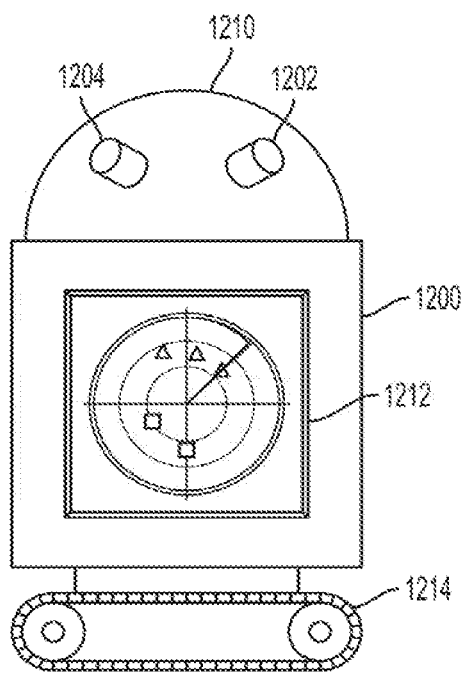

FIG. 7B illustrates a robot having an upper rotatable portion 1210, to which components such as the projector 1202 and camera 1204 may be mounted, in accordance with implementations of the disclosure. The robot further includes a display 1212, which can be configured to render any kind of data. In some implementations, the display 1212 of the robot can be used as a secondary display to show information useful to a player during a video game. The display 1212 can be touchscreen display, and capable of receiving input from a user via touches and gestures on the touchscreen display. The robot further employs a continuous track system 1214 (also known as a tank tread or caterpillar tread) for propulsion of the robot.

Figure 7C:
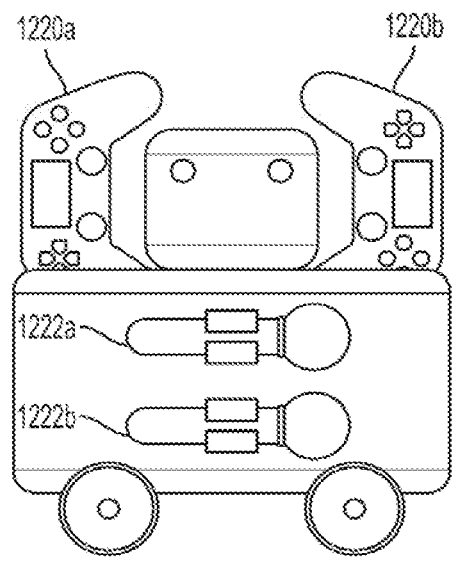

FIG. 7C illustrates a robot configured to also function as a storage location for controllers and/or other interface devices, in accordance with implementations of the disclosure. In the illustrated implementation, the robot is configured to hold/store controllers 1220a and 1220b, and motion controllers 1222a and 1222b. The robot can include any of various kinds of devices for holding a controller or other interface device, such as a clasp, clip, strap, clamp, pocket, hole, recess, etc.

Figure 7D:
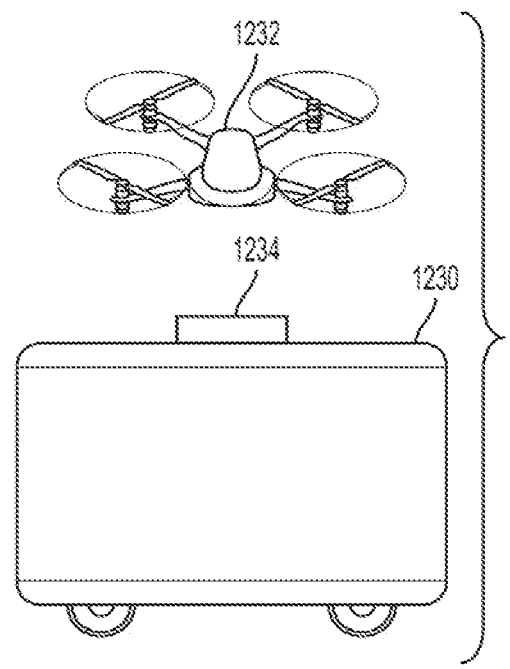

FIG. 7D illustrates a robot having a main body 1230 and a launchable drone 1232, in accordance with implementations of the disclosure. When not in flight, the drone 1232 may rest on, and/or be secured to, a support structure 1234 on the main body 1230. The support structure 1234 may include contacts configured to mate with corresponding contacts on the drone 1232, to enable communication of data between the drone 1232 and the main body 1230 of the robot, as well as charging of the drone's battery. It will be appreciated that the drone 1232 may include various components useful for its operation and/or that may be used while the drone is in flight, such as a camera, depth camera, microphone, projector, inertial/motion sensors, wireless transceiver, etc. The drone 1232 may communicate wirelessly with the main body 1230 and be controlled via wireless signals sent from the main body 1230. The drone 1232 can be activated and flown so as to provide elevated vantage points for image capture, audio capture, projection, audio rendering, etc.

FIG. 7E illustrates a robot having the form-factor of a humanoid device, in accordance with implementations of the disclosure. The robot includes a head 1240 that can be articulated, and may include devices such as a camera, projector, etc. The robot further includes arms 1242, which can be articulated, and configured to clasp items, perform gestures, etc. The robot further includes legs 1244, which can be articulated, and configured to enable the robot to walk/run or otherwise move about the local environment.

FIG. 7F illustrates a robot having a rotatable ball-shaped portion 1250, in accordance with implementations of the disclosure. In some implementations, the ball-shaped portion 1250 can be rotated omnidirectionally, so as to redirect any device mounted thereto, such as a camera, projector, microphone, etc. The ball-shaped portion 1250 is supported by a mid-portion 1252, that is rotatable about a base portion 1254, thereby providing greater flexibility of movement of the devices of the robot.

FIG. 7G illustrates a robot having a body 1260 defined between wheels 1262, in accordance with implementations of the disclosure. In some implementations, the wheels 1262a and 1626b are oversized so as to be substantially larger than the body 1260, to enable the robot to traverse obstacles or other discontinuities. In some implementations, the center of gravity of the body 1260 is configured to be below the level of the axis of the wheels 1262a and 1262b, so that the orientation of the body 1260 is easily maintained while having only two wheels for support.

Figure 8:
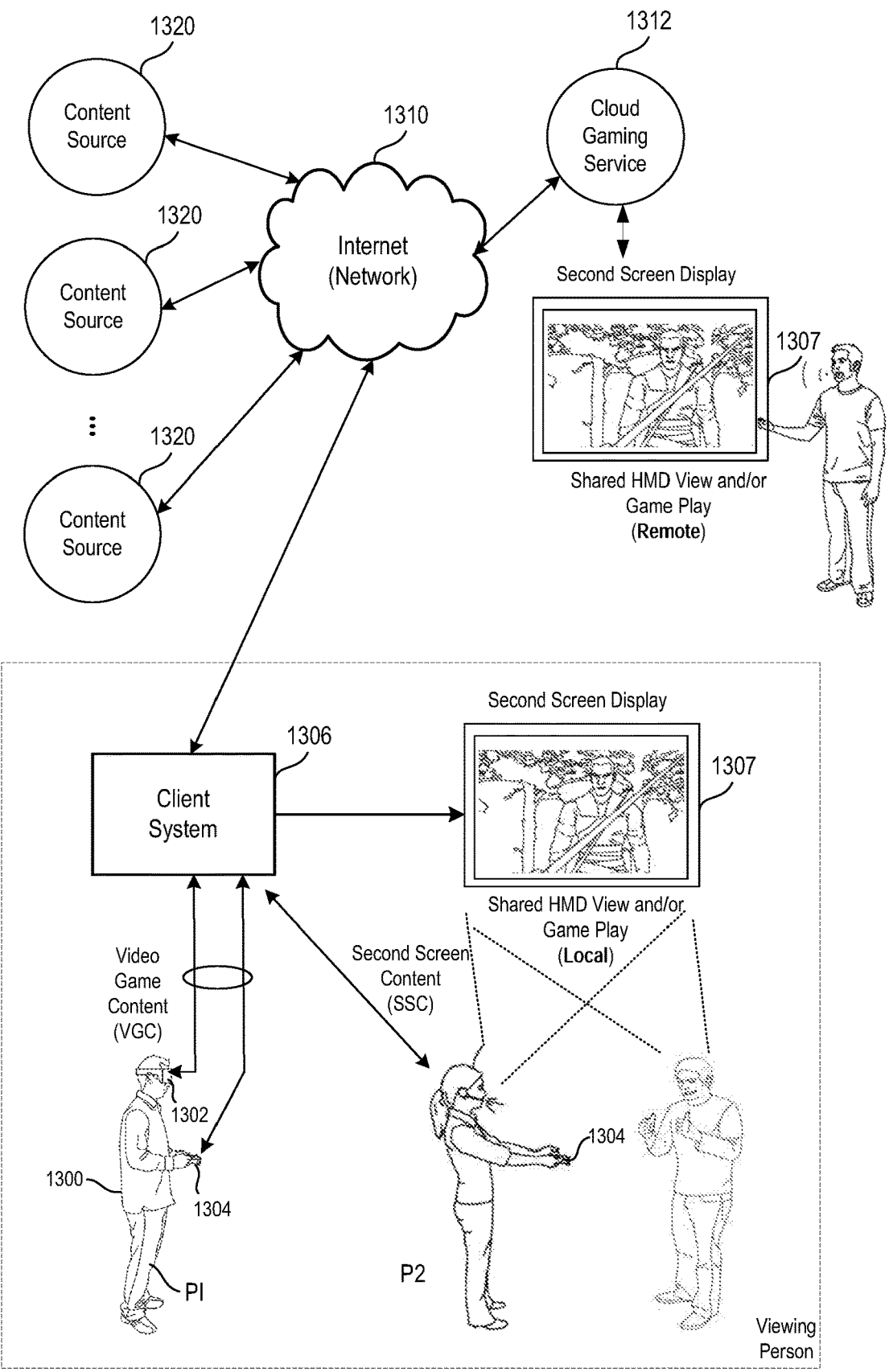
FIG. 8 illustrates one example of a user interfacing with a client system, and the client system providing content to a second screen display, which is referred to as a second screen, in accordance with one embodiment.

FIG. 8 illustrates one example of an HMD 102 user 1300 interfacing with a client system 1306, and the client system 1306 providing content to a second screen display, which is referred to as a second screen 1307. The client system 1306 may include integrated electronics for processing the sharing of content from the HMD 1302 to the second screen 1307. Other embodiments may include a separate device, module, connector, that will interface between the client system and each of the HMD 1302 and the second screen 1307. In this general example, user 1300 is wearing HMD 1302 and is playing a video game using a controller, which may also be directional interface object 1304. The interactive play by user 1300 will produce video game content (VGC), which is displayed interactively to the HMD 1302.

In one embodiment, the content being displayed in the HMD 1302 is shared to the second screen 1307. In one example, a person viewing the second screen 1307 can view the content being played interactively in the HMD 1302 by user 1300. In another embodiment, another user (e.g. player 2) can interact with the client system 1306 to produce second screen content (SSC). The second screen content produced by a player also interacting with the controller 1304 (or any type of user interface, gesture, voice, or input), may be produced as SSC to the client system 1306, which can be displayed on second screen 1307 along with the VGC received from the HMD 1302.

Accordingly, the interactivity by other users who may be co-located or remote from an HMD user can be social, interactive, and more immersive to both the HMD user and users that may be viewing the content played by the HMD user on a second screen 1307. As illustrated, the client system 1306 can be connected to the Internet 1310. The Internet can also provide access to the client system 1306 to content from various content sources 1320. The content sources 1320 can include any type of content that is accessible over the Internet.

Such content, without limitation, can include video content, movie content, streaming content, social media content, news content, friend content, advertisement content, etc. In one embodiment, the client system 1306 can be used to simultaneously process content for an HMD user, such that the HMD is provided with multimedia content associated with the interactivity during gameplay. The client system 106 can then also provide other content, which may be unrelated to the video game content to the second screen. The client system 1306 can, in one embodiment receive the second screen content from one of the content sources 1320, or from a local user, or a remote user.

Figure 9:
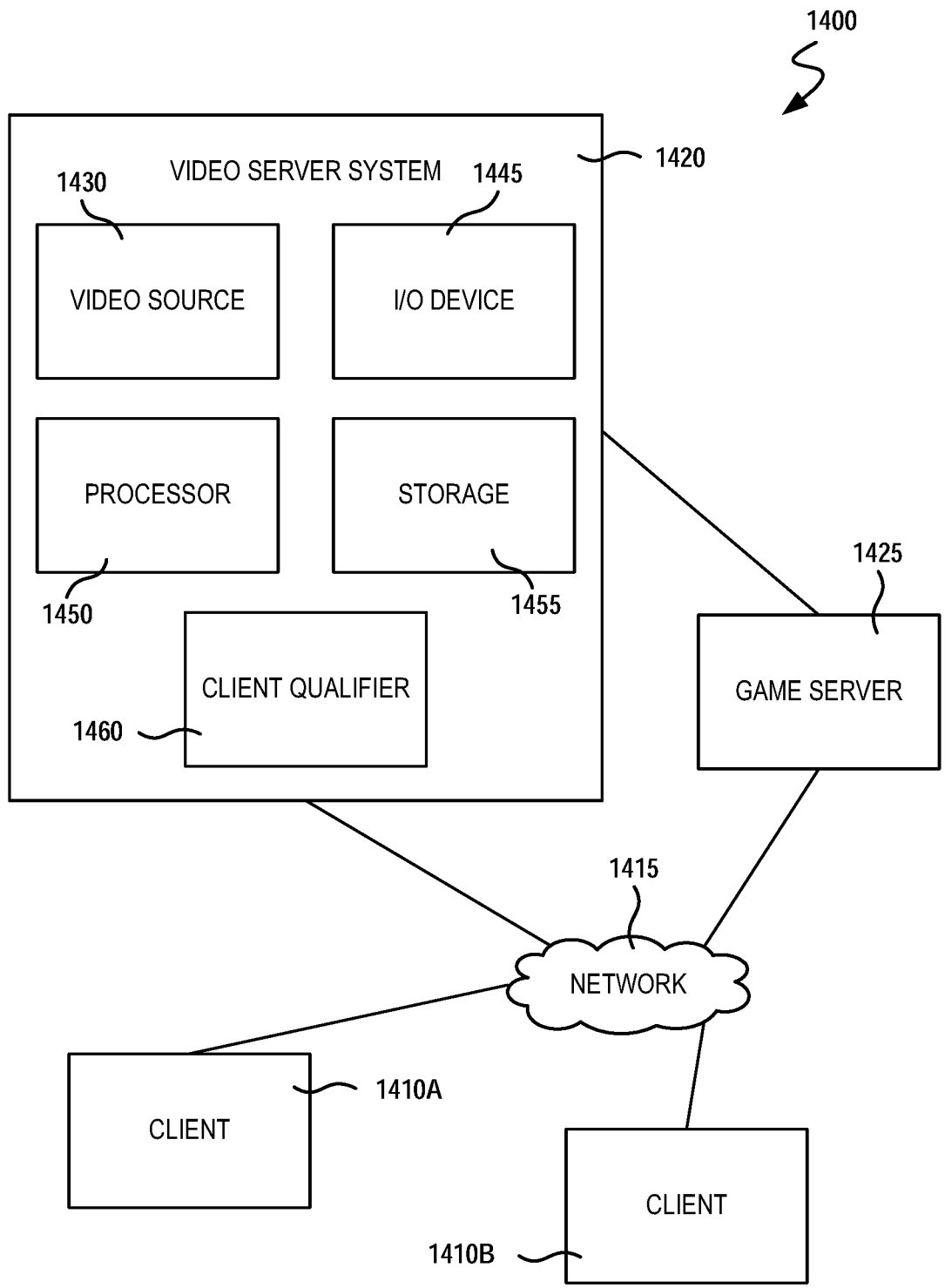
FIG. 9 is a block diagram of a Game System 1400, according to various embodiments of the disclosure.

FIG. 9 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
    using a robot having a plurality of sensors to acquire sensor data about a local environment;
    processing the sensor data to generate a spatial model of a real object in the local environment, the spatial model defining virtual surfaces that correspond to real surfaces of the real object in the local environment;
    further processing the sensor data to generate texture information that is associated to the virtual surfaces defined by the spatial model;
    wherein using the robot to acquire sensor data includes sampling at least one representative portion of the real surfaces in the local environment to enable the generation of the texture information that is associated to the virtual surfaces;
    wherein sampling a given representative portion includes moving the robot to different locations and capturing images of the given representative portion from a plurality of angles as defined from the different locations;

wherein processing the sensor data to generate the texture information includes processing the images captured from the plurality of angles to generate texture information for a given virtual surface defined by the spatial model that corresponds to the real surface from which the given representative portion was sampled;

using the spatial model and the texture information to render a virtual object corresponding to the real object in a virtual environment.

2. The method of claim 1, wherein rendering the virtual object in the virtual environment includes rendering a view of the virtual environment to a display device.

3. The method of claim 2, wherein the display device is a head-mounted display (HMD), and wherein an orientation of the HMD in the local environment defines a direction of the view of the virtual environment.

4. The method of claim 2, wherein rendering the view of the virtual environment includes rendering one or more of the virtual surfaces, which are defined by the spatial model, using the texture information associated to the one or more of the virtual surfaces.

5. The method of claim 1, wherein the sensors include at least one image capture device and at least one depth camera, and wherein the sensor data includes image data captured by the image capture device and depth data captured by the depth camera.

6. The method of claim 1, wherein the texture information includes one or more of a diffuse map, a bump map, and/or a specular map.

7. The method of claim 1, wherein using the robot to acquire sensor data includes moving the robot to a plurality of locations within the local environment and using the sensors of the robot at each of the locations to sense the real object and generate the sensor data.

8. The method of claim 1, wherein sampling the representative portion of a given real surface includes using the plurality of sensors to acquire sensor data for the representative portion of the given surface from different locations.

9. The method of claim 1, wherein sampling the representative portion of a given real surface is in response to determining that the given real surface has a substantially consistent texture.

10. A system, comprising:
a robot, the robot having a plurality of sensors that acquire sensor data about a local environment;
a computing device, the computing device processing the sensor data to generate a spatial model of a real object in the local environment, the spatial model defining virtual surfaces that correspond to real surfaces of the real object in the local environment;
the computing device further processing the sensor data to generate texture information that is associated to the virtual surfaces defined by the spatial model;
wherein the plurality of sensors of the robot acquire the sensor data by sampling at least one representative portion of the real surfaces in the local environment to enable the generation of the texture information that is associated to the virtual surfaces;
wherein sampling a given representative portion includes the robot moving to different locations and capturing images of the given representative portion from a plurality of angles as defined from the different locations;
wherein processing the sensor data to generate the texture information includes processing the images captured from the plurality of angles to generate texture information for a given virtual surface defined by the spatial model that corresponds to the real surface from which the given representative portion was sampled;
wherein the computing device uses the spatial model and the texture information to render a virtual object corresponding to the real object in a virtual environment.

11. The system of claim 10, wherein rendering the virtual object in the virtual environment includes rendering a view of the virtual environment to a display device.

12. The system of claim 11, further comprising:
a head-mounted display (HMD) that defines the display device, and wherein an orientation of the HMD in the local environment defines a direction of the view of the virtual environment.

13. The system of claim 11, wherein rendering the view of the virtual environment includes rendering one or more of the virtual surfaces, which are defined by the spatial model, using the texture information associated to the one or more of the virtual surfaces.

14. The system of claim 10, wherein the sensors include at least one image capture device and at least one depth camera, and wherein the sensor data includes image data captured by the image capture device and depth data captured by the depth camera.

* * * * *